United States Patent Office 3,116,103
Patented Dec. 31, 1963

3,116,103
TEXTILE COLOURATION PROCESS
George Albert Gamlen, Cyril Morris, Donald Frank Scott, and Harry James Twitchett, Manchester, England, assignors to Imperial Chemical Industries Limited, London, England, a corporation of Great Britain
No Drawing. Filed Sept. 16, 1960, Ser. No. 56,350
Claims priority, application Great Britain Sept. 24, 1959
12 Claims. (Cl. 8—18)

This invention relates to a new colouring process and more particularly it relates to a process for colouring textile materials.

According to the invention there is provided a process for colouring textile materials which comprises treating the said textile materials with a dyestuff which contains at least one group of the formula:

—A—Z     (Formula I)

wherein A represents an oxygen or a sulphur atom or a NY group wherein Y represents a hydrogen atom or a substituted or unsubstituted alkyl radical or a cycloalkyl radical, and Z represents a heterocyclic ring which contains at least one

group and which is attached to A through a carbon atom of the heterocyclic ring, and which carries attached to a carbon atom or atoms of the heterocyclic ring at least one group of the formula:

     (Formula II)

wherein $R^1$ and $R^2$ each represent a methyl radical and $R^3$ represents a substituted or unsubstituted aliphatic radical, or at least two of $R^1$, $R^2$ and $R^3$ are joined or fused together to form with the nitrogen atom N a heterocyclic ring or rings so that the nitrogen atom is linked to carbon atoms present in the said heterocyclic ring or rings through either single bonds or through a single bond and a double bond, provided that the said

group is free from sulphonic acid groups.

Each of the groups of Formula I, as hereinbefore defined, is attached to a carbon atom present in the dyestuff. The said carbon atom may form part of an aryl residue present in the dyestuff or may form part of an alkyl chain which is directly attached to an aryl residue present in the dyestuff or is attached to the aryl residue through a bridging atom or group. As examples of such bridging atoms and groups there may be mentioned —O—, —S—, —NH—, —CONH—, —SO₂NH— and
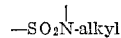

The dyestuff may be a member of any known dyestuff series and preferably it is a dyestuff of the azo, which may be monoazo or polyazo, nitro, anthraquinone, or phthalocyanine series, which may or may not contain a water-solubilising group such as a carboxylic acid, an alkylsulphone or a sulphamyl group and above all a sulphonic acid group. If desired the dyestuff may also contain co-ordinately bound metal, such as coordinately bound copper, chromium or cobalt.

The substituted or unsubstituted alkyl radicals represented by Y are preferably lower alkyl radicals such as methyl, ethyl, propyl and butyl which may contain substituents such as hydroxy and methoxy groups. As an example of a cycloalkyl radical represented by Y there may be mentioned cyclohexyl. It is however preferred that A represents an —NY— group, and Y preferably represents a hydrogen atom.

As examples of the heterocyclic rings represented by Z there may be mentioned quinazoline, phthalazine, pyridine, quinoline and preferably pyrimidine and above all 1:3:5-triazine rings.

When Z represents a 1:3:5-triazine ring which only carries one group of Formula II, then the 1:3:5-triazine ring may carry an additional substituent. As examples of such subsubstituents there may be mentioned alkyl for example methyl and ethyl, aryl for example phenyl, mercapto and substituted mercapto such as alkylmercapto for example methylmercapto or arylmercapto for example phenylmercapto, halogen atoms for example chlorine and bromine atoms, hydroxy, alkoxy for example methoxy, ethoxy and propoxy, aryloxy for example phenoxy, chlorophenoxy and sulphophenoxy, naphthoxy, thiocyano, sulphonic acid, amino and substituted amino groups such as methylamino, ethylamino, β-hydroxyethylamino, dimethylamino, di(β-hydroxyethyl)amino, anilino, 2-, 3- or 4-sulphoanilino, disulphoanilino, carboxyanilino, sulphonaphthylamino and disulphonaphthylamino groups, or the residues of aminoazo compounds which optionally contain a group of Formula I as hereinbefore defined.

When Z represents a pyrimidine ring which only carries one or two groups of Formula II then the pyrimidine ring may carry an additional substituent or substituents. As examples of such substituents there may be mentioned halogen atoms such as chlorine and bromine atoms, alkyl radicals in particular lower alkyl radicals such as methyl and ethyl, hydroxy, cyano, nitro, carboxylic acid and carboalkoxy groups such as carbomethoxy and carboethoxy groups.

As examples of the substituted or unsubstituted aliphatic radicals represented by $R^3$ there may be mentioned alkenyl radicals such as the allyl radical, alkyl radicals for example lower alkyl radicals such as methyl, ethyl, propyl and buty radicals, substituted alkyl radicals for example substituted lower alkyl radicals such as hydroxy lower alkyl radicals which may be exemplified by hydroxyethyl and hydroxypropyl radicals, alkoxy lower alkyl radicals which may be exemplified by methoxyethyl and ethoxyethyl radicals, aryl substituted lower alkyl radicals which may be exemplified by benzyl and β-phenylethyl radicals, substituted amino lower alkyl radicals which may be exemplified by β-dimethylaminoethyl, γ-dimethylaminopropyl, γ-dimethylaminobutyl and γ-diethylaminopropyl radicals and carboxy lower alkyl radicals such as carboxymethyl and carboxyethyl radicals. It is however preferred that $R^3$ represents a lower alkyl radical, in particular a methyl radical.

The term "lower alkyl radical" is used to denote alkyl radicals containing from 1 to 6 carbon atoms.

As examples of the heterocyclic rings formed by joining together at least two of the groups represented by $R^1$, $R^2$ and $R^3$ and the nitrogen atom N so that the nitrogen atom is joined to carbon atoms of the heterocyclic rings through single bonds there may be mentioned pyrrolidine, pyrroline, piperidine, morpholine, piperazine and pyrrole rings, but it is preferred that $R^1$, $R^2$ and $R^3$ are joined together to form with the nitrogen atom N a polycyclic heterocyclic ring structure in which the nitrogen atom N is common to at least 2 of the rings present in the heterocyclic ring structure, and preferably none of the rings present in the heterocyclic ring structure shall contain more than 2 nitrogen atoms. As examples of such polycyclic heterocyclic ring structures there may be mentioned pyrrolizidine, 1-azabicyclo-(2:2:1)-heptane, quinuclidine, 1-azabicyclo(3:2:1)-octane, 1-azabicyclo-(3:2:2)-nonane, 1-isogranatanine, conidine, 1:5-diazabicyclo-(3:3:1)-nonane, julolidine, hexahydrojulolidine and lilolidine ring structures, and above all the 1:4-diazabicyclo-(2:2:2)-octane ring structure.

As examples of the heterocyclic rings formed by joining or fusing together at least two of $R^1$, $R^2$ and $R^3$ so that the nitrogen atom N is joined to carbon atoms of the heterocyclic rings through a single bond and a double bond there may be mentioned unsaturated 6-membered heterocyclic rings which may contain substituents or form part of condensed ring systems. As examples of such heterocyclic rings there may be mentioned isoquinoline and preferably pyridine rings which may be substituted by, for example, alkyl radicals in particular the methyl radical, or halogen atoms.

The dyestuffs, as hereinbefore defined, can be applied to the textile materials by a dyeing or a printing process.

According to a further feature of the invention there is provided a process for dyeing textile materials which comprises dyeing the textile material with an aqueous solution or suspension of one or more of the dyestuffs, as hereinbefore defined.

This process of the invention may be conveniently brought about by immersing the textile material in a dyebath comprising an aqueous solution or suspension of one or more of the dyestuffs and heating the dyebath for a period at a suitable temperature, for example at a temperature between 40° and 100° C. The dyed textile material is then removed from the dyebath, rinsed in water and dried. If desired the dyeing may be carried out at a temperature above 100° C., for example at temperatures between 100° and 130° C. under superatmospheric pressure.

If desired the dyeing of the textile materials, especially cellulose textile materials, with the dyestuffs as hereinbefore defined, can be carried out in conjunction with a treatment with an acid-binding agent or a substance which on heating liberates an acid-binding agent, and this treatment can be carried out before, during or after the application of the dyestuff.

Thus the textile material may be immersed in an aqueous solution or suspension of the acid-binding agent and the so-treated textile material subsequently immersed in the dyebath comprising an aqueous solution or suspension of the one or more of the said dyestuffs, at a temperature of between 0° and 100° C., removing the dyed textile material from the dyebath and if desired subjecting the dyed textile material to a treatment in a hot aqueous solution of soap.

If desired the textile material which has been treated with an aqueous solution or suspension of the acid-binding agent may be passed between rollers to remove excess aqueous solution or suspension of the acid-binding agent and/or dried before being treated with the aqueous solution or suspension of the said dyestuffs.

Alternatively the aqueous solution or suspension of the said dyestuffs may be applied by padding to the textile material which has been treated with the acid-binding agent and the textile material then passed between rollers and subsequently subjected to the action of heat or steam.

Alternatively this process of the invention may be brought about by padding the textile material with an aqueous solution or suspension of one or more of the dyestuffs, as hereinbefore defined, which also contains an acid-binding agent, passing the so-treated textile material between rollers, if desired drying the textile material at a suitable temperature, for example at a temperature of 70° C., and then subjecting the textile material to the action of heat or steam.

Alternatively the textile material can be dyed by immersing it in a dyebath comprising an aqueous solution or suspension of one or more of the said dyestuffs which also contains an acid-binding agent, at a suitable temperature, for example at a temperature between 0° and 100° C., and thereafter removing the textile material from the dyebath, if desired subjecting it to a treatment in a hot aqueous solution of soap and finally drying the dyed textile material.

Alternatively this process of the invention may be conveniently brought about by applying the aqueous solution or suspension of one or more of the said dyestuffs, to the textile material by a dyeing or a padding method and subsequently immersing the coloured textile material in an aqueous solution or suspension of the acid-binding agent, preferably at a temperature between 50° C. and 100° C., or alternatively the coloured textile material may be padded with an aqueous solution or suspension of the acid-binding agent, the textile material dried and then subjected to the action of heat or steam.

Alternatively the textile material can be immersed in the dyebath comprising an aqueous solution or suspension of one or more of the said dyestuffs, the dyebath heated for a period at a suitable temperature, for example at a temperature between 20° and 100° C., the acid-binding agent added and dyeing continued for a further period at the same or a different temperature.

As examples of acid-binding agents which may be used there may be mentioned sodium hydroxide, potassium hydroxide, sodium carbonate, potassium carbonate, sodium metasilicate, trisodium phosphate, tripotassium phosphate, magnesium oxide and ammonium hydroxide. If desired substances, for example sodium trichloracetate and sodium bicarbonate, may be used which liberate an acid-binding agent when subjected to the action of heat or steam.

The concentration of the acid-binding agent present in the aqueous solution or suspension or in the aqueous solution or suspension of the dyestuffs is not critical but it is preferred to use between 0.1% and 10% of the acid-binding agent based on the total weight of the aqueous solution or suspension. If desired the aqueous solution or suspension of the acid-binding agent may also contain further substances, for example electrolytes such as sodium chloride and sodium sulphate.

The dyebaths comprising an aqueous solution or suspension of one or more of the said dyestuffs may also contain substances which are known to assist the application of dyestuffs to textile materials, for example sodium chloride, sodium sulphate, urea, dispersing agents, surface-active agents, sodium alginate or an emulsion of an organic liquid, for example trichloroethylene in water.

When the textile material used in the dyeing process is a nitrogen-containing textile material, such as wool or a polyamide textile material, then the dyestuffs, as hereinbefore defined, can be applied from a mildly alkaline, neutral or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.5 to 7.5 or higher if desired. The dyebath may also contain substances which are commonly used in the dyeing of nitrogen-containing textile materials. As examples of such substances there may be mentioned ammonium acetate, sodium sulphate, ethyl tartrate, non-ionic dispersing agents such as condensates of ethylene oxide with amines, fatty alcohols or phenols, surface-active cationic agents such as quaternary ammonium salts for example cetyl trimethylammonium bromide and cetyl pyridinium bromide and organic liquids such as n-butanol and benzyl alcohol.

According to a further feature of the invention there is provided a process for printing textile materials which comprises treating the textile material with a printing paste containing one or more of the dyestuffs, as hereinbefore defined, and subsequently heating or steaming the printed textile material.

This process of the invention may be conveniently brought about by applying the print paste containing one or more of the dyestuffs to the textile material, optionally drying the textile material, and subsequently subjecting the printed textile material to the action of heat or steam, preferably at a temperature between 100° and 140° C.

The print paste may be applied to the textile materials by any of the methods known for applying print pastes to textile materials such as roller printing, block printing, screen printing and spraying.

The print pastes may also contain any of the adjuvants which are commonly added to print pastes such as urea, thiourea, ethanol, sodium m-nitrobenzenesulphonate and sodium dibenzylsulphanilate, and thickening agents such as methyl cellulose, starch, locust bean gum, alginates such as sodium alginate, oil-in-water emulsions and water-in-oil emulsions.

If desired the printing of the textile materials, especially cellulose textile materials, with print pastes containing one or more of the dyestuffs, as hereinbefore defined, can be carried out in conjunction with a treatment with an acid-binding agent or a substance which on heating or steaming gives rise to an acid-binding agent.

Thus the textile material can be padded through an aqueous solution or suspension of the acid-binding agent, the so-treated textile material dried then printed with a print paste containing one or more of the said dyestuffs and the printed textile material subsequently heated or steamed.

Alternatively the acid-binding agent can be incorporated in the print paste, or the print paste may be applied to the textile material and the printed textile material treated with an aqueous solution or suspension of the acid-binding agent before being heated or steamed.

At the conclusion of the dyeing and/or printing processes it is preferred to subject the so-coloured textile materials to a "soaping" treatment, which may be carried out by immersing the coloured textile materials for a short time, for example 15 minutes, in a hot aqueous solution of soap and/or detergent, rinsing the coloured textile materials in water and finally drying the textile materials.

As examples of textile materials which may be coloured by the processes of the invention there may be mentioned cellulose textile materials such as cotton, linen and viscose rayon, nitrogen-containing textile materials for example natural nitrogen-containing textile materials such as wool and silk, and synthetic nitrogen-containing textile materials for example polyamide textile materials such as polyhexamethyleneadipamide and the polymer from caprolactam, and polyacrylonitrile and modified polyacrylonitrile textile materials, aromatic polyester textile materials and textile materials comprising organic derivatives of cellulose such as secondary cellulose acetate and cellulose triacetate.

The dyestuffs, as hereinbefore defined, which are used in the processes of the invention may be obtained by treating a dyestuff compound containing at least one group of the formula:

—A—Z'  (Formula III)

wherein A has the meaning stated above and Z' represents a heterocyclic ring which contains at least one

group and which is attached to A through a carbon atom of the heterocyclic ring and which carries at least one labile halogen atom or labile group with a tertiary amine of the formula: NR¹R²R³ wherein R¹, R² and R³ have the meanings stated above.

As examples of tertiary amines of the above formula which may be used to obtain the dyestuffs used in the processes of the invention there may be mentioned trimethylamine, N:N-dimethyl-N-ethylamine, N:N-dimethylbenzylamine, N:N - dimethyl-N-β-hydroxyethylamine, N:N-dimethyl-N-n-propylamine, N:N-dimethyl-N-isopropylamine, N:N-dimethyl-N-n-butylamine, N:N-dimethyl-N - β-ethoxyethylamine, 1:3-bis(N:N-dimethylamino)butane, N:N-dimethyl-N-allylamine, pyrrolizidine, 1-azabicyclo-(2:2:1)-octane, quinuclidine, 1-azabicyclo-(3:2:1)-octane, 1-azabicyclo-(3:2:2)-nonane, 1-iso-granatanine, conidine, 1:5 - diazabicyclo - (3:3:1)-octane, julolidine, hexahydrojulolidine, 1:4 - diazabicyclo - (2:2:2) - octane, pyridine, 2-, 3- or 4-methylpyridine and isoquinoline. Preferred tertiary amines are trimethylamine, 1:4-diazabicyclo-(2:2:2)-octane and pyridine.

As examples of labile halogen atoms which are attached to the heterocyclic ring represented by Z' there may be mentioned bromine and above all chlorine atoms.

As examples of labile groups which are attached to Z' there may be mentioned sulphonic acid, thiocyano, sulphonated aryloxy and sulphonated arylthio groups and groups of the formula:

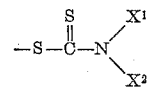

or

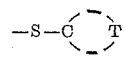

wherein X¹ and X² each represent a substituted or unsubstituted alkyl, cycloalkyl, aryl, aralkyl or heterocyclic radical and may be the same or different, or X¹ and X² together form with the nitrogen atom N a 5- or 6-membered heterocyclic ring, and T represents the group of non-metallic atoms required to form a 5- or 6-membered heterocyclic ring which may carry substituents or form part of a condensed ring system.

As examples of the sulphonated aryloxy and sulphonated arylthio groups there may be mentioned sulphophenoxy, disulphophenoxy, chlorosulphophenoxy, sulphonaphthoxy, disulphonaphthoxy and sulphophenylthio groups.

As examples of the substituted or unsubstituted radicals represented by X¹ and X² there may be mentioned alkyl radicals for example lower alkyl radicals such as methyl, ethyl, propyl, amyl and butyl radicals, substituted alkyl radicals for example substituted lower alkyl radicals such as hydroxy lower alkyl radicals for example hydroxyethyl, hydroxypropyl and dihydroxypropyl radicals, alkoxy lower alkyl radicals for example methoxyethyl and ethoxyethyl radicals, aryl substituted lower alkyl radicals such as benzyl and β-phenylethyl radicals, cycloalkyl radicals such as the cyclohexyl radical, aryl radicals for example monocyclic aryl radicals such as phenyl and tolyl radicals, and dicyclcic aryl radicals such as the naphthyl radical, which aryl radicals may contain substitutents such as chlorine or bromine atoms or nitro, alkoxy, sulphonic acid or carboxylic acid groups. As examples of the heterocyclic radicals represented by X¹ and X² there may be mentioned pyridyl and morpholino. As examples of the 5- or 6-membered heterocyclic rings which are formed by joining X¹ and X² together with the nitrogen atom N there may be mentioned piperidyl and morpholino.

As examples of the 5- or 6-membered heterocyclic rings formed by the

group there may be mentioned furane, oxazole, pyrazole, selenazole, thiophene, pyran, pyridine, pyridazine and especially thiazole rings. The 5- or 6-membered heterocyclic rings may form part of a condensed ring system such as quinoline, benzthiazole or naphthothiazole ring.

As examples of substituents which may be present in the heterocyclic rings there may be mentioned alkyl such as methyl and halogen such as chlorine. It is however preferred that the sulphur atom is attached to a carbon atom of the said 5- or 6-membered heterocyclic ring which is adjacent to an oxygen, sulphur, nitrogen or selenium atom present in the said 5- or 6-membered heterocyclic ring.

The dyestuff compounds containing at least one group of Formula III may themselves be obtained by reacting a dyestuff compound containing at least one —AH group, which is preferably a —NHY group, with a heterocyclic compound containing at least one

group and which contains at least 2 halogen atoms or at least one halogen atom and one labile group, as hereinbefore defined.

As examples of such heterocyclic compounds containing at least 2 halogen atoms or at least 1 halogen atom and 1 labile group there may be mentioned cyanuric chloride, cyanuric bromide, 2:4-dichloro-1:3:5-triazine,
2-methoxy-4:6-dichloro-1:3:5-triazine,
2-ethoxy-4:6-dichloro-1:3:5-triazine,
2-methyl-4:6-dibromo-1:3:5-triazine,
2-phenyl-4:6-dichloro-1:3:5-triazine,
2-methylamino-4:6-dichloro-1:3:5-triazine,
2-ethylamino-4:6-dichloro-1:3:5-triazine,
1:4-bis(4':5'-dichloro-1':3':5'-triazin-2'-ylamino)benzene,
2-phenoxy-4:6-dichloro-1:3:5-triazine,
2-(sulphophenoxy)-4:6-dichloro-1:3:5-triazine,
1-(4':6'-dichloro-1':3':5'-triazin-2'-ylamino)-7-(o-sulphophenylazo)-8-naphthol-3:6-disulphonic acid,
2-amino-4:6-dichloro-1:3:5-triazine,
2-anilino-4:6-dichloro-1:3:5-triazine,
2-(2'-, 3'- or 4'-sulphoanilino)-4:6-dichloro-1:3:5-triazine,
2-(3':5'-disulphoanilino)-4:6-dichloro-1:3:5-triazine,
2-(2'-, 3'- or 4'-carboxyanilino)-4:6-dichloro-1:3:5-triazine,
2-mercapto-4:6-dichloro-1:3:5-triazine,
2-hydroxy-4:6-dichloro-1:3:5-triazine,
2-methylmercapto-4:6-dichloro-1:3:5-triazine,
2-phenylmercapto-4:6-dichloro-1:3:5-triazine,
2:4:6-tribromopyrimidine,
2:4:6-trichloropyrimidine,
2:4:5:6-tetrachloropyrimidine,
2:4:5:6-tetrabromopyrimidine,
2:4:6-trichloro-5-nitropyrimidine,
2:4-dichloro-5-nitro-6-methylpyrimidine,
2:4-dichloro-5-nitropyrimidine,
2:4:6-trichloro-5-methylpyrimidine,
2:4:6-trichloro-5-cyanopyrimidine,
2:4:6-tribromo-5-cyanopyrimidine,
2-methyl-5-cyano-4:6-dichloropyrimidine,
2-methyl-4:6-dichloro-5-nitropyrimidine,
2:4-dichloro-5-carboxypyrimidine,
2:4-dichloro-5-carbomethoxypyrimidine,
2:6-dichloroquinoline,
2:6-dichloro-4-methylpyridine,
1:4-dichlorophthalazine,
2:4-dichloroquinazoline,
2:4:8-trichloroquinazoline,
2-chloro-4-(diethylthiocarbamoylthio)-6-methoxy-1:3:5-triazine,
2-chloro-4-(diethylthiocarbamoylthio)-6-phenyl-1:3:5-triazine,
2-(benzthiaz-2'-ylthio)-4-chloro-6-methoxytriazine,
2-(benzthiaz-2'-ylthio)-4-chloro-6-phenyl-1:3:5-triazine and
2-(benzthiaz-2'-ylthio)-4-chloro-6-diethylamino-1:3:5-triazine.

(The last five compounds may themselves be obtained by condensing the appropriate 2:4-dichloro-6-substituted-1:3:5-triazine with sodium diethyldithiocarbamate or with 2-mercaptobenzthiazole.)

As examples of dyestuff compounds containing at least one —NHY group, as hereinbefore defined, there may be mentioned the compounds of the following classes without, however, limiting the classes to those specifically described.

(1) Monoazo compounds of the formula:

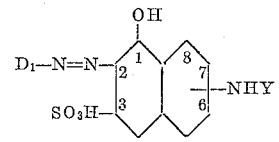

(IV)

wherein $D_1$ represents an at most di-cyclic aryl radical which is free from azo groups and NHY groups, the —NHY group is preferably attached to the 6-, 7- or 8-position of the naphthalene nucleus, and which may contain a sulphonic acid group in the 5- or 6-position of the naphthalene nucleus.

$D_1$ may represent a radical of the naphthalene or benzene series which is free from azo substitutents, for example a stilbene, diphenyl, benzthiazolylphenyl or diphenylamine radical. Also in this class are to be considered the related dyestuffs in which the NHY group, instead of being attached to the naphthalene nucleus, is attached to a benzoylamino or anilino group which is attached to the 6-, 7- or 8-position of the naphthalene nucleus.

Particularly valuable dyestuffs are obtained from those wherein $D_1$ represents a sulphonated phenyl or naphthyl radical, especially those which contain a —SO$_3$H group in ortho position to the azo link; the phenyl radical may be further substituted for example, by halogen atoms such as chlorine, alkyl radicals such as methyl, acylamino groups such as acetylamino and alkoxy radicals such as methoxy.

(2) Disazo compounds of Formula IV, wherein $D_1$ stands for a radical of the azobenzene, azonaphthalene or phenylazonaphthalene series and the naphthalene nucleus is substituted by the NHR group, and optionally by sulphonic acid as in class 1.

(3) Monoazo compounds of the formula:

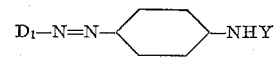

(V)

wherein $D_1$ stands for an at most dicyclic aryl radical as described for class 1 and is preferably a disulphonaphthyl or a stilbene radical, and the benzene nucleus may contain further substituents such as halogen atoms, or alkyl, alkoxy, carboxylic acid and acylamino groups (4) Mono- or disazo compounds of the formula:

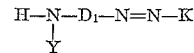

(VI)

wherein $D_1$ represents an arylene radical such as a radical of the azobenzene, azonaphthalene or phenylazonaphthalene series, or, preferably, an at most dicyclic arylene radical of the benzene or naphthalene series, and K represents the radical of a naphthol sulphonic acid or the radical of an enolised or enolisable ketomethylene compound (such as an acetoacetarylide or a 5-pyrazolone) having the OH group o- to the azo group. $D_1$ preferably represents a radical of the benzene series containing a sulphonic acid group.

(5) Mono- or disazo compounds of the formula:

$$D_1-N=N-K_2-NHY \quad (VII)$$

wherein $D_1$ represents a radical of the types defined for $D_1$ in classes 1 and 2 above and $K_2$ represents the radical of an enolisable ketomethylene compound (such as an acetoacetarylide or a 5-pyrazolone) having the —OH group in α-position to the azo group.

(6) The metal complex, e.g. the copper, chromium and cobalt complex, compounds of those dyes of Formulae IV, VI and VII (wherein $D_1$, K and $K_2$ have all the respective meanings stated) which contain a metallisable (for example, a hydroxyl, lower alkoxy or carboxylic acid) group ortho to the azo group in $D_1$.

(7) Anthraquinone compounds of the formula:

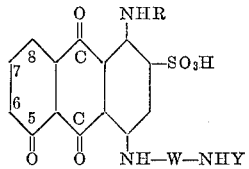

wherein the anthraquinone nucleus may contain an additional sulphonic acid group in the 5-, 6-, 7- or 8-position and W represents a bridging group which is preferably a divalent radical of the benzene series, for example phenylene, diphenylene, or 4,4'-divalent stilbene or azobenzene radicals. It is preferred that Y should contain one sulphonic acid group for each benzene ring present.

(8) Phthalocyanine compounds of the formula:

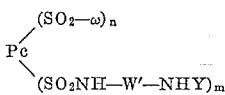

wherein Pc represents the phthalocyanine nucleus preferably of copper phthalocyanine, ω represents a hydroxy and/or an amino or substituted amino group, W' represents a bridging group, preferably an aliphatic, cycloaliphatic or aromatic bridging group, $n$ and $m$ each represent 1, 2 or 3 and may be the same or different provided that $n+m$ is not greater than 4.

(9) Nitro dyestuffs of the formula:

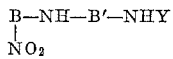

wherein B and B' represent monocyclic aryl nuclei, the nitro group in B being ortho to the NH group.

In class 1:

6-amino-1-hydroxy-2-(2'-sulphophenylazo)naphthalene-3-sulphonic acid,
6-methylamino-1-hydroxy-2-(4'-acetylamino-2'-sulphophenylazo)naphthalene-3-sulphonic acid,
8-amino-1-hydroxy-2-(2'-sulphophenylazo)naphthalene-3:6-disulphonic acid,
8-amino-1-hydroxy-2-(4'-chloro-2'-sulphophenylazo)-naphthalene-3:5-disulphonic acid,
7-amino-2-(2':5'-disulphophenylazo)-1-hydroxynaphthalene-3-sulphonic acid,
7-methylamino-2-(2'-sulphophenylazo)-1-hydroxynaphthalene-3-sulphonic acid,
7-methylamino-2-(4'-methoxy-2'-sulphophenylazo)-1-hydroxynaphthalene-3-sulphonic acid;
8-(3'-aminobenzoylamino)-1-hydroxy-2-(2'-sulphophenylazo)naphthalene-3:6-disulphonic acid,
8-amino-1-hydroxy-2:2'-azonaphthalene1':3:5':6-tetrasulphonic acid,
8-amino-1-hydroxy-2:2'-azonaphthalene-1':3:5'-trisulphonic acid,
6-amino-1-hydroxy-2:2'-azonaphthalene-1':3:5'-trisulphonic acid,
6-methylamino-1-hydroxy-2:2'-azonaphthalene-1':3:5'-trisulphonic acid,
7-amino-1-hydroxy-2:2'-azonaphthalene-1':3-disulphonic acid,
8-amino-1-hydroxy-2-(4'-hydroxy-3'-carboxyphenylazo)-naphthalene-3:6-disulphonic acid,
6-amino-1-hydroxy-2-(4'-hydroxy-3'-carboxyphenylazo)-naphthalene-3:5-disulphonic acid.

In class 2:

8-amino-1-hydroxy-2-[4'-(2''-sulphophenylazo)-2'-methoxy-5'-methylphenylazo]naphthalene-3:6-disulphonic acid,
8-amino-1-hydroxy-2-[4'-(4''-methoxyphenylazo)-2'-carboxyphenylazo]naphthalene-3:6-disulphonic acid,
8-amino-1-hydroxy-2-[4'-(2''-hydroxy-3'':6''-disulpho-1''-naphthylazo)-2'-carboxyphenylazo]naphthalene-3:6-disulphonic acid,
4:4'-bis(8''-amino-1''-hydroxy-3'':6''-disulpho-2''-naphthylazo)-3:3'-dimethoxydiphenyl,
6-amino-1-hydroxy-2-[4'-(2''-sulphophenylazo)-2'-methoxy-5'-methylphenylazo]naphthalene-3:6-disulphonic acid.

In class 3:

2-(4'-amino-2'-methylphenylazo)naphthalene-4:8-disulphonic acid,
2-(4'-amino-2'-acetylaminophenylazo)naphthalene-5:7-disulphonic acid,
4-nitro-4'-(4'''-methylaminophenylazo)stilbene-2:2'-disulphonic acid,
4-nitro-4'-(4'''-amino-2''-methyl-5''-methoxyphenylazo)-stilbene-2:2'-disulphonic acid,
4-amino-4'-(4''-methoxyphenylazo)stilbene-2:2'-disulphonic acid,
4-amino-2-methylazobenzene-2':5'-disulphonic acid.

In class 4:

1-(2':5'-dichloro-4'-sulphophenyl)-3-methyl-4-(3''-amino-4''-sulphophenylazo)-5-pyrazolone,
1-(4'-sulphophenyl)-3-carboxy-4-(4''-amino-3''-sulphophenylazo)-5-pyrazolone,
1-(2'-methyl-5'-sulphophenyl)-3-methyl-4-(4''-amino-3''-sulphophenylazo)-5-pyrazolone,
1-(2'-sulphophenyl)-3-methyl-4-(3''-amino-4''-sulphophenylazo)-5-pyrazolone,
4-amino-4'-(3''-methyl-1'''-phenyl-4''-pyrazol-5''-onylazo)stilbene-2:2'-disulphonic acid,
4-amino-4'-(2''-hydroxy-3'':6''-disulpho-1''-naphthylazo)stilbene-2:2'-disulphonic acid,
8-acetylamino-1-hydroxy-2-(3'-amino-4'-sulphophenylazo)naphthalene-3:6-disulphonic acid,
7-(3'-sulphophenylamino)-1-hydroxy-2-(4'-amino-2'-carboxyphenylazo)naphthalene-3-sulphonic acid,
8-phenylamino-1-hydroxy-2-(4'-amino-2'-sulphophenylazo)naphthalene-3:6-disulphonic acid,
6-acetylamino-1-hydroxy-2-(5'-amino-2'-sulphophenylazo)naphthalene-3-sulphonic acid.

In class 5:

1-(3'-aminophenyl)-3-methyl-4-(2':5'-disulphophenylazo)-5-pyrazolone,
1-(3'-amino-phenyl)-3-carboxy-4-(2'-carboxy-4'-sulphophenylazo)-5-pyrazolone,
4-amino-4'-[3''-methyl-4''-(2''':5'''-disulphophenylazo)-1''-pyrazol-5''-onyl]stilbene-2:2'-disulphonic acid,
1-(3'-aminophenyl)-3-carboxy-4-[4''-(2''':5'''-disulphophenylazo)-2''-methoxy-5''-methylphenylazo]-5-pyrazolone.

In class 6:

The copper complex of 8-amino-1-hydroxy-2-(2'-hydroxy-5'-sulphophenylazo)naphthalene-3:6-disulphonic acid,
The copper complex of 6-amino-1-hydroxy-2-(2'-hydroxy-5'-sulphophenylazo)naphthalene-3-sulphonic acid,
The copper complex of 6-amino-1-hydroxy-2-(2'-hydroxy-5'-sulphophenylazo)naphthalene-3:5-disulphonic acid,
The copper complex of 8-amino-1-hydroxy-2-(2'-hydroxy-3'-chloro-5'-sulphophenylazo)naphthalene-3:6-disulphonic acid,
The copper complex of 6-methylamino-1-hydroxy-2-(2'-carboxy-5'-sulphophenylazo)naphthalene-3-sulphonic acid, The copper complex of 8-amino-1-hydroxy-2-[4'-(2''-sulphophenylazo)-2'-methoxy-5'-methylphenylazo]-naphthalene-3:6-disulphonic acid, The copper complex of 6-amino-1-hydroxy-2-[4'-(2''':5'''-disulphophenylazo)-2'-methoxy-5'-methylphenylazo]-naphthalene-3:5-disulphonic acid, The copper complex of 1-(3'-amino-4'-sulphophenyl)-3-methyl-4-[4''-(2''':5'''-disulphophenylazo)-2''-methoxy-5''-methylphenylazo]-5-pyrazolone, The copper complex of 7-(4'-amino-3'-sulphoanilino)-1-hydroxy-2-[4''-(2''':5'''-disulphophenylazo)-2''-methoxy-5''-methylphenylazo]naphthalene-3-sulphonic acid, The copper complex of 6-(4'-amino-3'-sulphoanilino)-1-hydroxy-2-(2''-carboxyphenylazo)naphthalene-3-sulphonic acid, The 1:2-chromium complex of 7-amino-6'-nitro-1:2'-dihydroxy-2:1'-azonaphthalene-3:4'-disulphonic acid, The 1:2-chromium complex of 6-amino-1-hydroxy-2-(2'-carboxyphenylazo)naphthalene-3-sulphonic acid, The 1:2-chromium complex of 8-amino-1-hydroxy-2-(4'-nitro-2'-hydroxyphenylazo)naphthalene-3:6-disulphonic acid, The 1:2-cobalt complex of 6-(4'-amino-3'-sulphoanilino)-1-hydroxy-2-(5''-chloro-2''-hydroxyphenylazo)-naphthalene-3-sulphonic acid, The 1:2-chromium complex of 1-(3'-amino-4'-sulphophenyl)-3-methyl-4-(2''-hydroxy-4''-sulpho-1'''-naphthylazo)-5-pyrazolone, The 1:2-chromium complex of 7-(4'-sulphoanilino)-1-hydroxy-2-(4''-amino-2''-carboxyphenylazo)-naphthalene-3-sulphonic acid, The 1:2-chromium complex of 1-(3'-aminophenyl)-3-methyl-4-(4''-nitro-2''-carboxyphenylazo)-5-pyrazolone.

In class 7:

1-amino-4-(3'-amino-4'-sulphoanilino)anthraquinone-2-sulphonic acid,
1-amino-4-(4'-amino-3'-sulphoanilino)anthraquinone-2:5-disulphonic acid,
1-amino-4-[4'-(4''-amino-3''-sulphophenyl)anilino]-anthraquinone-2:5-disulphonic acid,
1-amino-4-[4'-(4''-amino-2''-sulphophenylazo)anilino]-anthraquinone-2:5-disulphonic acid,
1-amino-4-(4'-methylamino-3'-sulphoanilino)-anthraquinone-2-sulphonic acid.

In class 8:

3-(3'-amino-4'-sulphophenyl)sulphamyl copper phthalocyanine-tri-3-sulphonic acid,
Di-4-(3'-amino-4'-sulphophenyl)sulphamyl copper phthalocyanine-di-4-sulphonic acid,
3-(3'-aminophenylsulphamyl)-3-sulphamyl copper phthalocyanine-di-3-sulphonic acid.

In class 9: 4-amino-2'-nitro-diphenylamino-3:4'-disulphonic acid.

Specific examples of dyestuff compounds containing at least one group of Formula III which can be reacted with a tertiary amine, as hereinbefore defined, to obtain the dyestuffs used in the processes of the invention are described in British specifications Nos. 209,723, 298,494, 467,815, 503,609, 772,030, 774,925, 775,308, 780,591, 781,930, 784,221, 785,120, 785,222, 802,935, 803,473, 805,562, 822,047, 822,948, 825,377, 826,405, 829,042 832,400, 833,396, 834,304, 836,248, 836,647, 837,035, 837,124, 837,953, 837,985, 838,311, 838,338, 838,340, 838,341, 838,342, 838,344, 838,345, 843,985, 846,765, and 846,949, in Belgian specifications Nos. 558,817, 559,945, 560,791, 560,792, 560,793, 560,794, 560,795, 563,439, 563,862, 570,122, 570,343, 571,238, 571,523, 571,893, 571,942, 572,833, 572,967, 573,299, 573,300, 573,301, 578,932, 578,933 and 581,401, and in the United States specification No. 2,258,977.

A preferred class of dyestuffs for use in the processes of the invention are those dyestuffs wherein the heterocyclic ring represented by Z contains only one group of Formula II, as hereinbefore defined.

As examples of dyestuffs falling within the preferred class there may be mentioned those dyestuffs which contain one or two groups of the formula:

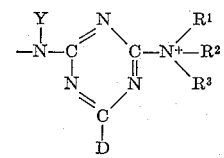

wherein $R^1$, $R^2$, $R^3$ and Y have the meanings stated above and D represents an amino or substituted amino group, which is preferably a sulphonated anilino group such as a 2-, 3- or 4-sulphoanilino or a 3:5-disulphoanilino group; and those dyestuffs which contain one or two groups of the formula:

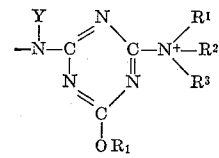

wherein $R^1$, $R^2$, $R^3$ and Y have the meanings stated above and $R_1$ represents an alkyl radical, which is preferably the methyl radical.

If desired the dyestuffs containing at least one group of Formula I, as hereinbefore defined, may be formed in situ in the dyebath or in the print paste by adding to the dyebath or print paste a dyestuff containing at least one group of Formula III, as hereinbefore defined, and a tertiary amine, as hereinbefore defined. Alternatively the dyestuffs can be formed in situ on the textile material by either treating the textile material in a dyebath or with a printing paste containing at least one group of Formula III and subsequently treating the dyed or printed textile material with the tertiary amine or by treating the textile material with the tertiary amine and subsequently treating the so-treated textile material in a dyebath or with a printing paste containing a dyestuff containing at least one group of Formula III, and if desired the in situ formation of the dyestuffs in the dyebath or print paste or on the textile material can be carried out in the presence of an acid-binding agent.

By the above processes there are produced on the textile materials a wide range of colourations which possess excellent fastness to wet treatments such as washing.

Alternatively the dyestuffs, as hereinbefore defined can be applied to textile materials, which are preferably cellulose textile materials in conjunction with a treatment with a resin-forming composition and an acid-catalyst whereby the textile materials are simultaneously coloured and rendered resistant to creasing, and the coloured textile materials so obtained have excellent fastness to wet treatments such as washing.

According to a further feature of the invention there is provided a process for colouring textile materials which comprises treating the said textile materials with an aqueous solution containing (1) A resin-forming composition known from the literature or used in practice for the production of textile materials having finishes resistant to creasing or to shrinking, or of modified handle, (2) An acid catalyst, and (3) A dyestuff as hereinbefore defined.

The resin-forming compositions in this process of the invention are compositions known from the literature or used in practice for the production of textile materials having finishes resistant to creasing or to shrinking or of modified handle. Suitable resin-forming compositions include epoxy resins, acetals, polyisocyanates, condensates or formaldehyde with cresols or with acrolein, and, in particular mixtures comprising the methylol derivatives or lower alkyl ethers of methylol derivatives of monomeric of polymeric compounds containing a plurality of amino or mono substituted amino groups said compounds being known from the art or used in practice for the formation of resins by condensation with formaldehyde. Suitable compounds include, for example, monomeric nitrogen compounds such as urea, thiourea, substituted ureas and thioureas, dicyandiamide, dicyandiamidine, biguanides, amides, carbamates, allophanates and heterocyclic compounds such as aminotriazines, urons, ureins, ureides, imidazolidones, triazones and hydantoins, or mixtures of such compounds, and polymeric nitrogen compounds such as the polymeric amides made by the reaction of dibasic acids with diamines. The lower alkyl ethers of the methylol derivatives of these compounds include for example the methyl, ethyl, propyl and butyl ethers.

As examples of acid catalysts which may be used in this process there may be mentioned salts formed from weak bases and mineral acids such as zinc chloride, ammonium sulphate and ammonium chloride, mineral acid salts such as zinc chloride, ammonium sulphate and ammonium chloride, mineral acid salts of organic amines, weak acids, for example organic acids such as oxalic acid, and substantially neutral substances which develop acidity on heating or steaming, such as magnesium chloride and ammonium thiocyanate.

This process of the invention may be conveniently brought about by applying the aqueous solution containing the dyestuff, the resin-forming composition and the acid-catalyst to the textile material, optionally drying the treated textile material, preferably at a temperature between 50° C. and 100° C., and thereafter baking the textile material at a temperature above 100° C., preferably at a temperature between 130° C. and 170° C.

The aqueous solution may be applied to the textile material by any known method. For example, it may be applied locally by printing the textile material with the aqueous solution in the form of a thickened printing paste; or it may be applied to the whole of the textile material by immersing, preferably by padding, the textile material in the aqueous solution.

The aqueous solutions used in the process of the invention may contain for example between 3% and 30% by weight and preferably between 5% and 20% by weight of the resin-forming compositions and between 0.1% and 5% by weight and preferably between 0.5% and 2% by weight of acid catalyst such as is common practice for the treatment of coloured textiles to form finishes resistant to creasing or shrinking or of modified handle and draping qualities.

When the aqueous solution is applied by padding, there may also be added to the aqueous solution minor amounts of other additives used in such processes for example softeners or lubricants, such as methylol stearamide or low molecular weight polyethylene, which improve the tear strength of the resin-treated material, polyhydroxy compounds, such as polyvinyl alcohol, cellulose ethers, starches and starch ethers or proteinaceous materials such as casein and gelatine which modify the handle of the material, or surface-active agents which aid the penetration of the textile by the aqueous solution. There may also be added thickening agents, the preferred thickeners being alginates, such as sodium alginate and more especially emulsions, which may be of the oil-in-water type or of the water-in-oil type.

When the aqueous solution is used in the form of a printing paste, it may contain the usual additives, in particular, the thickening agents exemplified in the previous paragraph.

The amount of dyestuff present in the aqueous solution will depend on the depth of shade required, and will normally be between 0.1% and 5% by weight of the solution.

The resulting coloured textile materials are preferably given a "soaping" treatment in a hot aqueous solution of soap or a synthetic detergent in order to remove any loosely-bound dyestuff and/or resin.

The process may be applied to any textile material for example textile materials made from animal proteins such as wool and silk, regenerated proteins, synthetic textile materials such as polyamides, polyurethanes, polyesters for example polycondensates of the polyethyleneterephthalate type or polymers of the polyvinyl acetate type, esters of cellulose, for example secondary cellulose acetate and cellulose triacetate, and is particularly useful for the treatment of vegetable fibres such as cotton and linen and regenerated cellulose such as viscose rayon.

A preferred class of acid catalysts which may be used in the process of the invention are the mineral acid salts, in particular the hydrochlorides of primary or secondary organic amines which contain at least one alkyl chain carrying at least one hydroxy group.

As examples of the said primary or secondary organic amines which, in the form of their salts with mineral acids, may be used in the process of the invention there may be mentioned primary or secondary organic amines which contain one or two hydroxyalkyl groups, which are preferably hydroxy lower alkyl groups such as hydroxyethyl, hydroxypropyl and hydroxlbutyl groups. As specific examples of such primary or secondary amines containing one or two hydroxyalkyl groups there may be mentioned $\beta$-hydroxyethylamine, N-methyl-N-($\beta$-hydroxyethyl)amine, N-ethyl-N-($\beta$-hydroxyethyl)amine, $\gamma$-hydroxypropylamine, $\beta$-hydroxypropylamine, $\beta$-, $\gamma$- or $\delta$-hydroxy-n-butylamine, N:N-di($\beta$-hydroxypropyl)amine, N-$\beta$-hydroxyethylaniline and N-benzyl-N-$\beta$-hydroxyethylamine.

Alternatively the said primary or secondary organic amines used in the process of the invention may contain one or two alkyl chains, which are preferably lower alkyl chains each of which carries at least two hydroxy groups. As specific examples of such primary or secondary organic amines there may be mentioned $\beta$:$\gamma$-dihydroxypropylamine, N-methylglucamine (which is also known as N-methyl-N-(pentahydroxy-n-hexyl)amine), N-ethylglucamine, N-($\beta$-hydroxyethyl)glucamine, N-methyl-N-($\beta$:$\gamma$-dihydroxypropyl)amine and 2-amino-1:2:3-propanetriol.

It is however preferred that the primary or secondary organic amine which, in the form of its salt with a mineral acid, is used in the process of the invention contains at least two hydroxy groups which may be attached to the same or different alkyl chains present in the organic amine.

The quantity of the mineral acid salt of the said primary or secondary organic amine used in the process of the invention usually amounts to between 0.1% and 5.0% by weight of the said aqueous solution and preferably the amount used lies between 0.25% and 2.0% by weight. If desired the mineral salt of the said primary or secondary organic amine can be used in conjunction with salts formed from weak bases and mineral acids, for example zinc chloride, ammonium sulphate, ammonium chloride, magnesium chloride, ammonium thiocyanate and zinc nitrate, but it is preferred that the total amount of the mineral acid salt of the said primary or secondary organic amine and the salt formed from a weak base and a mineral acid does not exceed 5% by weight of the said aqueous solution and preferably does not exceed 2% by weight.

If desired there may also be present a quantity of the free primary or secondary organic amine, as hereinbefore defined, but it is preferred that the total amount of the free primary or secondary organic amine and the mineral acid salt of the said primary or secondary organic amine does not exceed 5% by weight of the said aqueous solution and preferably does not exceed 2% by weight.

If desired there may also be present in the aqueous solution migration inhibitors which will minimise the movement of the dyestuff and/or resin solution on the textile material.

As examples of such migration inhibitors there may be mentioned inorganic salts such as sodium chloride and sodium sulphate, and organic salts such as sodium alginate.

If desired the dyestuffs may be formed in situ in the aqueous solution used in this process of the invention by adding to the aqueous solution a dyestuff containing at least one group of Formula III and a tertiary amine, as hereinbefore defined. If desired some or all of the tertiary amine can be used in the form of a salt with a mineral acid such as hydrochloric acid in which case some or all of the acid catalyst, as hereinbefore defined, can be omitted from the aqueous solution.

The invention is illustrated but not limited by the following examples in which the parts and percentages are by weight:

*Example 1*

100 parts of a cotton limbric are immersed in a dye-bath comprising a solution of 1 part of the trisodium salt of 4-{4'-[7"-(2'''-sulphophenylazo) - 8" - hydroxy-3":6"-disulphonaphth-1"-ylamino] - 6'-anilino - 1':3':5'-triazin-2'-yl}-1-aza-4-azoniabicyclo-(2:2:2) - octane chloride (which may be obtained as described below) in 3000 parts of water at a temperature of 25° C., and 150 parts of sodium chloride are then added gradually during 30 minutes. 20 parts of sodium carbonate are then added and dyeing is continued for 90 minutes at 25° C. The cotton limbric is then removed from the dyebath, rinsed in water, immersed for 15 minutes in a 0.3% aqueous solution of a condensate of ethylene oxide with an alkylphenol at a temperature of 85° C., rinsed again in water and dried.

The cotton limbric is dyed a bright red shade which possesses excellent fastness to wet treatments.

The dyestuff used in the above example may be obtained as follows:

A mixture of 16 parts of 1:4-diazabicyclo-(2:2:2)-octane, 77.4 parts of the trisodium salt of 2-chloro-4-[7'-(2"-sulphophenylazo) - 8'-hydroxy-3':6'-disulphonaphth-1'-ylamino]-6-anilino-1:3:5-triazine (which may be obtained as described in Example 2 of British specification No. 834,304) and 2000 parts of water is stirred for 2 hours at a temperature between 20° and 22° C. 600 parts of sodium chloride are then added, the mixture is stirred for 2 hours and the mixture is then filtered. The filtrate so obtained is kept for 17 hours and the dyestuff which separates out is filtered off and dried.

*Example 2*

4.2 parts of the trisodium salt of 2-chloro-4-[7'-(2"-sulphophenylazo)-8'-hydroxy - 3':6' - disulphonaphth-1'-ylamino]-6-anilino-1:3:5-triazine, 6.0 parts of 1:4-diazabicyclo-(2:2:2)-octane, 10 parts of urea, 1.5 parts of sodium bicarbonate, 35 parts of sodium alginate and 43.3 parts of water are mixed together to give a print paste containing the trisodium salt of 4-{4'-[7"-(2'''-sulphophenylazo)-8"-hydroxy - 3":6" - disulphonaphth - 1" - ylamino]-6'-anilino-1':3':5'-triazin-2'-yl} - 1 - aza - 4 - azoniabicyclo-(2:2:2)-octane chloride. The print paste is then applied to a woven unmercerised cotton cloth by roller printing, the printed cloth so obtained is dried at a temperature between 60° and 70° C. and is then steamed for 30 seconds at atmospheric pressure. The printed cloth is then rinsed in water, immersed for 10 minutes in a 0.3% aqueous solution of a condensate of ethylene oxide with an alkylphenol at 100° C., rinsed again in water and dried.

A bright red print is obtained on the woven cotton cloth possessing excellent fastness to washing and the print obtained is much stronger tincotorially than the print which is obtained in the same manner from the print paste which is obtained by mixing together the above ingredients except that the 6.0 parts of 1:4-diazabicyclo-(2:2:2)-octane are replaced by 6 parts of water.

When the woven unmercerised cotton cloth used in the above example is replaced by a woven viscose rayon cloth a similar result is obtined.

*Example 3*

A woven unmercerised woven cotton cloth is immersed in a 2% aqueous solution of sodium carbonate and the cotton cloth is then squeezed between rollers until its weight is doubled. The first print paste of Example 2 is then applied to the cotton cloth by roller printing and the printed cotton cloth is then hung for 20 hours at a temperature of 20° C. The printed cotton cloth is then rinsed in water, immersed for 10 minutes in a 0.3% aqueous solution of a condensate of ethylene oxide with an alkylphenol at a temperature of 100° C., rinsed again in water and finally dried.

A bright red print is obtained on the cotton cloth possessing excellent fastness to washing and the print obtained is much stronger tinctorially than the print which is obtained in the same manner from the second print paste described in Example 2, which does not contain any 1:4-diazabicyclo-(2:2:2)-octane.

When the woven unmercerised cotton cloth used in the above example is replaced by a woven viscose rayon cloth a similar result is obtained.

*Example 4*

100 parts of cotton limbric are immersed in a dye-bath comprising a solution of 1 part of the trisodium salt of 2-chloro-4-[7'-/2"-sulphophenylazo) - 8' - hydroxy-3':6'-disulphonaphth-1'-ylamino]-6-anilino - 1:3:5 - triazine in 3000 parts of water at a temperature of 25° C. 150 parts of sodium chloride are then gradually added to the dyebath during 30 minutes, followed by 25 parts of sodium carbonate. After 5 minutes 10 parts of 1:4-diazobicyclo-(2:2:2)-octane are added to the dyebath and dyeing is continued for 1 hour at a temperature of 25° C. The dyed cotton limbric is then removed from the dyebath, rinsed in water, treated for 15 minutes in a 0.3% aqueous solution of a condensate of ethylene oxide with an alkylphenol, rinsed again in water and dried.

The cotton limbric is dyed a bright red shade possessing excellent fastness to washing and the shade obtained is very much stronger tinctorially than the shade of the dyeing obtained as described above except that the 10 parts of 1:4-diazabicyclo-(2:2:2)-octane are not added to the dyebath.

When the 10 parts of 1:4-diazabicyclo-(2:2:2)-octane used in the above example are replaced by 10 parts of pyrrolizidine or by 10 parts of N-methylpyrrolidine or by 10 parts of 4-morpholinopyridine or by 10 parts of 4-piperidinopyridine similar result are obtained.

*Example 5*

In place of the 1 part of the dyestuff used in Example 4 there is used 1 part of the trisodium salt of 2-(4'-chloro-6'-methoxy - 1':3':5' - triazin-2'-yl-N-methylamino)-6-(2"-sulpho-4"-methoxyphenylazo) - 5 - naphthol-7-sulphonic acid whereby the cotton limbric is dyed a bright scarlet shade possessing excellent fastness to washing, and the shade obtained is very much stronger tinctorially than the shade of the dyeing obtained from the above dyestuff when the 10 parts of 1:4-diazabicyclo-(2:2:2)-octane are omitted from the dyebath.

The dyestuff used in the above example may be obtained by coupling diazotised 4-aminoanisole-3-sulphonic acid with 2-N-methylamino-5-naphthol-7-sulphonic acid and subsequently condensing with 2-methoxy-4:6-dichloro-1:3:5-triazine.

*Example 6*

In place of the 1 part of the dyestuff used in Example 4 there is used 1 part of the trisodium salt of 1-(4'-chloro-6'-hydroxy-1':3':5'-triazin - 2' - ylamino)-7-(2''-sulphophenylazo)-8-naphthol-3:6-disulphonic acid whereby the cotton limbric is dyed a bright red shade possessing excellent fastness to washing. When the 10 parts of 1:4-diazabicyclo-(2:2:2)-octane are not added to the dyebath the cotton limbric is only slightly coloured.

*Example 7*

In place of the 1 part of the dyestuff used in Example 4 there is used 1 part of the trisodium salt of the copper complex of 2-(4''-chloro-6''-m-sulphoanilino-1'':3'':5''-triazin-2''-ylamino) - 7 - (5'-sulpho - 2' - hydroxyphenylazo)-8-naphthol-6-sulphonic acid whereby the cotton limbric is dyed a rubine shade possessing excellent fastness to washing. When the 10 parts of 1:4-diazabicyclo-(2:2:2)-octane are not added to the dyebath the cotton limbric is only slightly coloured.

The dyestuff used in the above example may be obtained by coupling diazotised 2-aminophenol-4-sulphonic acid with 2-amino-8-naphthol-6-sulphonic acid, converting to the copper complex by heating with an aqueous solution of cupramonium sulphate, condensing with cyanuric chloride and subsequently treating with metanilic acid.

*Example 8*

In place of the 1 part of the dyestuff used in Example 4 there is used 1 part of the disodium salt of 2-[2'-acetylamino - 4' - (4'' - chloro-6''-amino-1'':3'':5''-triazin-2''-ylamino) - phenylazo]naphthalene-4:8-disulphonic acid whereby the cotton limbric is dyed a bright yellow shade possessing excellent fastness to washing, and the shade obtained is very much stronger tinctorially than the dyeing obtained from the above dyestuff when the 10 parts of 1:4-diazabicyclo-(2:2:2)-octane are omitted from the dyebath.

The dyestuff used in the above example may be obtained by coupling diazotised 2-aminonaphthalene-4:8-disulphonic acid with m-aminoacetanilide, condensing with cyanuric chloride and subsequently treating with ammonia.

*Example 9*

In place of the 1 part of the dyestuff used in Example 4 there is used 1 part of the sodium salt of copper phthalocyanine - 3 - sulphon - N-[2'-sulpho-5'-(4''-chloro-6''-m-sulphophenylamino - 1'':3'':5'' - triazin - 2'' - ylamino) phenyl]amide sulphonic acid whereby the cotton limbric is dyed a bright greenish-blue shade possessing excellent fastness to washing and the shade obtained is very much stronger tinctorially than the shade of the dyeing obtained from the above dyestuff when the 10 parts of 1:4-diazabicyclo-(2:2:2)-octane are omitted from the dyebath. The dyestuff used in the above example may be obtained by condensing copper phthalocyanine-3-sulphon-N-(2'-sulpho-5'-aminophenyl)amide sulphonic acid with cyanuric chloride and subsequently treating with metanilic acid.

*Example 10*

In place of the 1 part of the dyestuff used in Example 4 there is used 1 part of the sodium salt of copper phthalocyanine - 3 - sulphon - N-[4'-(dichloropyrimidylamino)-phenyl]amide sulphonic acid whereby the cotton limbric is dyed a bright greenish-blue shade possessing excellent fastness to washing. When the 10 parts of 1:4-diazabicyclo-(2:2:2)-octane are not added to the dyebath the cotton limbric is only slightly coloured.

The dyestuff used in the above example may be obtained by condensing copper phthalocyanine-3-sulphon-N-(4'-aminophenyl)amide sulphonic acid with 2:4:6-trichloropyrimidine.

*Example 11*

100 parts of viscose rayon fabric are padded through a solution of 20 parts of the trisodium salt of 1-(4'':6''-dichloro - 1'':3'':5'' - triazin - 2''-ylamino)-7-(2'-sulphophenylazo)-8-naphthol-3:6-disulphonic acid (which may be obtained as described in Example 4 of British specification No. 785,222) and 50 parts of sodium chloride in 1000 parts of water and the fabric is then squeezed between rollers until its weight is 200 parts. The fabric is then immersed for 10 seconds in a solution of 10 parts of 1:4-diazabicyclo-(2:2:2)-octane and 50 parts of sodium chloride in 1000 parts of water at a temperature of 20° C. The fabric is then immersed for 15 minutes in a 0.3% aqueous solution of a condensate of ethylene oxide with an alkylphenol at a temperature of 85° C., rinsed in water and dried. The viscose rayon fabric is dyed a bright red shade possessing excellent fastness to washing and the shade obtained is very much stronger tinctorially than the shade of a dyeing obtained as described above except that the fabric was not treated in the aqueous solution containing the 1:4-diazabicyclo-(2:2:2)-octane.

*Example 12*

100 parts of bleached cotton yarn are immersed in a dyebath comprising a solution of 2 parts of the trisodium salt of 1 - (dichloropyrimidylamino)-7-(2'-sulphophenylazo)-8-naphthol-3:6-disulphonic acid in 3000 parts of water at a temperature of 20° C. 150 parts of sodium chloride are then added gradually during 30 minutes. 5 parts of a 40% aqueous solution of trimethylamine and 60 parts of sodium carbonate are then added and dyeing is continued for 1 hour at a temperature of 20° C. The cotton yarn is then removed from the dyebath, rinsed in water, immersed for 15 minutes in a 0.3% aqueous solution of soap at 100° C., rinsed again in water and finally dried.

The cotton yarn is dyed a red shade possessing excellent fastness to wet treatments and the shade obtained is much stronger tinctorially than the shade of a dyeing obtained as described above except that the 5 parts of a 40% aqueous solution of trimethylamine are not added to the dyebath.

The dyestuff used in the above example may be obtained by the method described in Example 9 of Belgian specification No. 573,299 except that the 17.3 parts of 1-aminobenzene-3-sulphonic acid are replaced by 17.3 parts of 1-aminobenzene-2-sulphonic acid.

*Example 13*

In place of the 2 parts of the dyestuff used in Example 12 there are used 2 parts of the trisodium salt of 1-(dichloropyrimidylamino) - 7 - (2' - sulpho-4'-methylphenylazo)-8-naphthol-3:6-disulphonic acid (which is described at Example 55 of Belgian specification No. 573,299) whereby a similar result is obtained.

*Example 14*

In place of the 25 parts of sodium carbonate and 10 parts of 1:4-diazabicyclo-(2:2:2)-octane used in Example 4 there are used 40 parts of trisodium phosphate crystals and 7 parts of a 40% aqueous solution of trimethylamine respectively when a similar result is obtained.

*Example 15*

100 parts of bleached mercerised cotton poplin are padded through a solution of 20 parts of the trisodium salt of 2-chloro-4-[7'-(2''-sulphophenylazo)-8'-hydroxy-3':6' - disulphonaphth - 1'-ylamino]-6-anilino-1:3:5-triazine, 60 parts of a 40% aqueous solution of trimethylamine, 20 parts of trisodium phosphate and 20 parts of sodium chloride in 1000 parts of water, and the cotton poplin is then squeezed between rollers until its weight is 200 parts. The cotton poplin is stored for 3 hours at a temperature of 20° C., then rinsed in water, immersed for 15 minutes in a 0.3% aqueous solution of a synthetic detergent at a temperature of 95° C., rinsed again in water and dried. The cotton poplin is coloured a bright red shade possessing excellent fastness to washing and the shade is much stronger tinctorially than the shade of a dyeing described as above except that the 60 parts of a 40% aqueous solution of trimethylamine are replaced by 60 parts of water.

The 20 parts of the dyestuff used in the above example can be replaced by 20 parts of the dyestuffs of Examples 55 and 71 of Belgian specification No. 573,299 when similar results are obtained.

*Example 16*

100 parts of a bleached woven cotton cloth are padded through an aqueous solution containing 20 parts of the copper complex of the tetrasodium salt of 4-[7'-(2''-hydroxy - 3'' - chloro - 5'' - sulphophenylazo) - 8' - hydroxy - 3':6' - disulphonaphth - 1' - ylamino] - 6 - (m-sulphoanilino) - 1:3:5 - triazin - 2 - yltrimethylammonium chloride (which may be obtained as described below), 100 parts of a 50% aqueous solution of dimethylol cyclic ethylene urea, 5 parts of N:N-di($\beta$-hydroxyethyl)amine hydrochloride, 5 parts of methylol stearamide, 5 parts of sodium triisopropylnaphthalene sulphonate and 5 parts of sodium chloride per 1000 parts of water, and the cotton cloth is then squeezed between rollers until its weight is 200 parts. The cotton cloth is dried at a temperature of 65° C. and is then baked for 3 minutes at a temperature of 150° C. The cotton cloth is then rinsed in water, immersed for 10 minutes in an aqueous solution, at a temperature of 70° C., containing 0.6% of sodium carbonate and 0.9% of a mixture of an alkylated phenol/ethylene oxide condensate and a sulphated fatty alcohol, rinsed again in water and finally dried.

The cotton cloth is coloured a purple shade which possesses excellent fastness to wet treatments and the cotton cloth is resistant to creasing.

In place of the bleached woven cotton cloth used in the above example there is used a spun viscose rayon fabric when a similar result is obtained.

In place of the 5 parts of N:N-di($\beta$-hydroxyethyl)-amine hydrochloride used in the above example there are used 15 parts of N-methylglucamine hydrochloride or 5 parts of ammonium nitrate or 8 parts of zinc chloride when similar results are obtained.

The copper-containing dyestuff used in the above example may be obtained as follows:

12.5 parts of a 40% aqueous solution of trimethylamine are added with stirring to a solution of 25 parts of the copper complex of the tetrasodium salt of 2-chloro-4-[7'-(2'' - hydroxy - 3'' - chloro - 5'' - sulphophenylazo) - 8'-hydroxy - 3':6' - disulphonaphth - 1' - ylamino] - 6 - (m-sulphoanilino)-1:3:5-triazine [which may itself be obtained by treating the trisodium salt of 1-amino-7-(2'-hydroxy - 3' - chloro - 5' - sulphophenylazo) - 8 - naphthol-3:6-disulphonic acid with an agent yielding copper and then with the sodium salt of 2:4-dichloro-6-(m-sulphoanilino)-1:3:5-triazine] and the resulting mixture is stirred for 10 minutes at a temperature of 20° C. The mixture is then poured into 2000 parts of acetone and the dyestuff which is precipitated is filtered off and dried.

*Example 17*

100 parts of a bleached linen fabric are padded through an aqueous solution containing 20 parts of the trisodium salt of 4-[7'-(2''-sulphophenylazo)-8'-hydroxy-3'-disulphonaphth - 1' - ylamino] - 6 - anilino - 1:3:5 - triazin-2-yltrimethylammonium chloride (which may be obtained as described below), 100 parts of a 50% aqueous solution of dimethylol glyoxal monourein, 12.5 parts of N:N-di($\beta$-hydroxyethyl)amine hydrochloride, 5 parts of methylol stearamide, 5 parts of sodium triisopropylnaphthalene sulphonate and 5 parts of sodium chloride per 1000 parts of water, and the linen fabric is then squeezed between rollers until its weight is 200 parts. The linen fabric is dried at a temperature of 70° C. and is then baked for 3 minutes at a tempearture of 150° C. The linen fabric is then rinsed in water, immersed for 10 minutes in an aqueous solution, at a temperature of 70° C., containing 0.6% of sodium carbonate and 0.9% of a mixture of an alkylated phenol/ethylene oxide condensate and a sulphated fatty alcohol, rinsed again in water and finally dried.

The linen fabric is coloured a bright red shade which possesses excellent fastness to wet treatments and the linen fabric is resistant to creasing.

In place of the bleached linen fabric used in the above example there is used a spun viscose rayon fabric when a similar result is obtained.

In place of the 12.5 parts of N:N-di($\beta$-hydroxyethyl)-amine hydrochloride used in the above example there are used 15 parts of N-methylglucamine hydrochloride or 8 parts of zinc nitrate hexahydrate when similar results are obtained.

The dyestuff used in the above example may be obtained as follows:

5 parts of a 40% aqueous soluution of trimethylamine are added with stirring to a solution of 10 parts of the trisodium salt of 7-(2'-sulphophenylazo)-1-(4''-chloro-6''-anilino - 1'':3'':5'' - triazin - 2'' - ylamino) - 8 - naphthol-3:6-disulphonic acid in 50 parts of water and the mixture so obtained is then stirred for 1 hour at a temperature of 25° C. The mixture is then poured into 500 parts of acetone and the dyestuff which is precipitated is filtered off and dried.

*Example 18*

In place of the 20 parts of the copper-containing dyestuff used in Example 16 there are used 20 parts of the trisodium salt of 4-[7'-(2''-sulphophenylazo)-8'-hydroxy-3':6' - disulphonaphthyl - 1' - ylamino] - 6 - anilino - 1:3:5-triazin-2-yltrimethylammonium chloride, whereby the bleached woven cotton cloth is coloured a bright red shade which is fast to wet treatments and the cotton is resistant to creasing.

*Example 19*

In place of the 20 parts of the dyestuff used in Example 17 there are used 20 parts of the copper complex of the tetrasodium salt of 4-[7'-(2''-hydroxy-3''-chloro-5''-sulphophenylazo) - 8' - hydroxy - 3':6' - disulphonaphth - 1'-ylamino] - 6 - (m-sulphoanilino) - 1:3:5 - triazin - 2 - yltrimethylammonium chloride, whereby the bleached linen fabric is coloured a pure shade which is fast to wet treatments and the fabric is resistant to creasing.

*Example 20*

100 parts of a bleached woven cotton cloth are padded through an aqueous solution containing 20 parts of the copper complex of the tetrasodium salt of 4-[7'-(2''-hydroxy-3''-chloro-5''-sulphophenylazo)-8'-hydroxy - 3':6'-disulphonaphth-1'-ylamino]-6-(m-sulphoanilino) - 1:3:5-triazin-2-yltrimethylammonium chloride, 100 parts of a 50% aqueous solution of dimethylol-N-$\beta$-hydroxyethyl-triazone, 5 parts of N:N-di($\beta$-hydroxyethyl)amine hydrochloride, 5 parts of ammonium nitrate, 5 parts of methylol stearamide and 2 parts of a condensate of ethylene oxide with a fatty alcohol per 1000 parts of water, and the cotton cloth is then squeezed between rollers until its weight is 200 parts. The cotton cloth is dried at a temperature of 65° C. and is then baked for 3 minutes at a temperature of 150° C. The cotton cloth is then rinsed in water, immersed for 10 minutes in an aqueous solution, at a temperature of 70° C., containing 0.6% of sodium carbonate and 0.9% of a mixture of an alkylated phenol/ethylene oxide condensate and a sulphated fatty alcohol, rinsed again in water and finally dried.

The cotton cloth is coloured a purple shade which possesses excellent fastness to wet treatments and the cotton cloth is resistant to creasing.

In place of the 100 parts of a 50% aqueous solution of dimethylol-N-$\beta$-hydroxyethyltriazone used in the above example there are used 100 parts of a 50% aqueous solu-

Example 21

In place of the 100 parts of a 50% aqueous solution of dimethylol glyoxal monourein used in Example 17 there is used 100 parts of a 50% aqueous solution of tetramethylol acetylene diurea whereby the linen fabric is coloured a bright red shade which possesses excellent fastness to wet treatments and the linen fabric is resistant to creasing.

Example 22

100 parts of a bleached woven cotton cloth are padded through an aqueous solution containing 20 parts of the copper complex of the tetrasodium salt of 2-chloro-4-[7'-(2''-hydroxy-3''-chloro-5''-sulphophenylazo) - 8' - hydroxy-3':6'-disulphonaphth-1' - ylamino] - 6 - (m-sulphoanilino)-1:3:5-triazine, 5 parts of trimethylamine hydrochloride, 5 parts of methylol stearamide, 5 parts of sodium triisopropylnaphthalene sulphonate, 5 parts of sodium chloride and 100 parts of a 50% aqueous solution of dimethylolcyclic ethylene urea per 1000 parts of water and the cotton cloth is then squeezed between rollers until its weight is 200 parts. The cotton cloth is dried at a temperature of 65° C. and is then baked for 3 minutes at a temperature of 150° C. The cotton cloth is then rinsed in water, immersed for 10 minutes in an aqueous solution, at a temperature of 70° C., containing 0.6% of sodium carbonate and 0.9% of a mixture of an alkylated phenol/ethylene oxide condensate and a sulphated fatty alcohol, rinsed again in water and finally dried. The cotton cloth is coloured a purple shade which possesses excellent fastness to wet treatments and the cotton cloth is resistant to creasing.

In place of the 5 parts of trimethylamine hydrochloride used in the above example there are used 2.5 parts of 1:4-diazabicyclo-(2:2:2)-octane hydrochloride when a similar result is obtained.

In place of the bleached woven cotton cloth used in the above example there is used a spun viscose rayon fabric which is also coloured a purple shade possessing excellent fastness to wet treatments and the fabric is resistant to creasing.

Example 23

In place of the 20 parts of the copper containing dyestuff used in Example 22 there are used 20 parts of the trisodium salt of 7-(2'-sulphophenylazo)-1-(4'' - chloro-6''-anilino-1'':3'':5''-triazin-2'' - ylamino) - 8 - naphthol-3:6-disulphonic acid whereby the cotton cloth is coloured a red shade which possesses excellent fastness to wet treatments and the cloth is resistant to creasing.

Example 24

100 parts of a bleached woven cotton cloth are padded through an aqueous solution containing 20 parts of the trisodium salt of [7'-(o-sulphophenylazo)-8' - hydroxy-3':6'-disulphonaphth-1'-ylamino]-chloropyrimidyltrimethylammonium chloride, 100 parts of a 50% aqueous solution of dimethyl glyoxal monourein, 10 parts of methylol stearamide, 5 parts of sodium triisopropylnaphthalene sulphonate, 7.5 parts of N:N-di(β-hydroxyethyl)-amine hydrochloride and 1.5 parts of ammonium nitrate per 1000 parts of water, and the cotton cloth is then squeezed between rollers until its weight is 200 parts. The cotton cloth is dried at a temperature of 70° C., and is then baked for 3 minutes at a temperature of 155° C. The cotton cloth is then rinsed in water, immersed for 1 minute in a boiling 0.3% aqueous solution of sodium carbonate, rinsed again in water and finally dried. The cotton cloth is coloured a bright red shade which is fast to washing and the cotton cloth is resistant to creasing.

The trisodium salt of [7'-(o-sulphophenylazo)-8'-hydroxy-3':6'-disulphonaphth-1'-ylamino]-chloropyrimidyltrimethylammonium chloride used in the above example may be obtained as follows:

5 parts of a 40% aqueous solution of trimethylamine are added to a solution of 10.5 parts of the trisodium salt of 1-(dichloropyrimidylamino)-7-(o-sulphophenylazo)-8-naphthol-3:6-disulphonic acid (which may be obtained as described in Example 9 of Belgian specification No. 573,299 except that the 17.3 parts of 1-aminobenzene-3-sulphonic acid are replaced by 17.3 parts of orthanilic acid) in 100 parts of water and the resulting mixture is stirred for 10 minutes at 20° C. 2000 parts of acetone are then added and the precipitated dyestuff is filtered off and dried.

Example 25

100 parts of pure silk yarn are immersed in a solution of 2.5 parts of the trisodium salt of 1-(4'-chloro-6'-anilino - 1':3':5' - triazin - 2' - ylamino) - 7 - (o - sulphophenylazo)-8-naphthol-3:6-disulphonic acid in 3000 parts of water at a temperature of 20° C., and 120 parts of sodium sulphate are then added gradually during 20 minutes. Dyeing is continued for 30 minutes at 20° C., 6 parts of sodium carbonate and 15 parts of 1:4-diazabicyclo-(2:2:2)-octane are then added and dyeing is continued for a further 45 minutes at 20° C. The dyed silk yarn is then removed from the dyebath and immersed for 20 minutes in an aqueous solution, at a temperature of 85° C., containing 0.2% of sodium carbonate and 0.2% of a condensate of ethylene oxide with an alkylphenol. The dyed silk yarn is then rinsed in water and finally dried. The silk yarn is dyed a bluish-red shade which posses excellent fastness to wet treatments. If the 15 parts of 1:4-diazabicyclo-(2:2:2)-octane are omitted from the dyebath the pure silk yarn is only slightly coloured.

Example 26

In place of the 15 parts of 1:4-diazabicyclo-(2:2:2)-octane used in Example 25 there are used 15 parts of N-methylpyrrolidine when a similar result is obtained.

Example 27

100 parts of purse silk yarn are immersed in a dyebath comprising a solution of 2.5 parts of the trisodium salt of 4-{-4'-[7'''-(2''' - sulphophenylazo)-8''-hydroxy-3'': 6'' - disulphonaphth - 1'' - ylamino] - 6' - anilino - 1':3': 5' - triazin - 2' - yl} - 1 - aza - 4 - azoniabicyclo - (2:2:2)-octane chloride in 3000 parts of water at a temperature of 20° C., and 120 parts of sodium sulphate are then added gradually during 20 minutes. Dyeing is continued for 75 minutes at 20° C., and the dyed silk yarn is then removed from the dyebath and given a "soaping treatment" by immersing it for 20 minutes in an aqueous solution, at a temperature of 85° C., containing 0.2% of sodium carbonate and 0.2% of a condensate of ethylene oxide with an alkylphenol. The dyed silk yarn is then rinsed in water and finally dried.

The silk yarn is dyed a bluish-red shade which possesses excellent fastness to washing.

Example 28

100 parts of polyamide textile material are immersed in a dyebath comprising a dispersion of 0.7 part of 2-hydroxy - 5 - methyl - 4' - [4'' - chloro - 6'' - di(β - hydroxyethyl)amino - 1''':3''':5''' - triazin - 2''' - ylamino]azobenzene in 4000 parts of water containing 4 parts of a condensate of ethylene oxide with a fatty alcohol and 2.5 parts of acetic acid, and dyeing is carried out for 1 hour at 95° C. 8 parts of sodium carbonate and 8 parts of 1:4-diazabicyclo-(2:2:2)-octane are then added and dyeing is continued for a further 45 minutes at 95° C. The dyed polyamide textile material is then removed from the dyebath, rinsed in water and dried.

The polyamide textile material is uniformly coloured a greenish-yellow shade and the wash fastness properties are superior to those of a dyeing obtained as described

Example 29

100 parts of cotton limbric are padded through a solution of 20 parts of 4-[4'-(2"-hydroxy-5"-methylphenylazo) - anilino] - 6 - [di - β - hydroxyethyl)amino] - 1:3: 5-triazin-2-yltrimethylammonium chloride (which may be obtained as described below) in 1000 parts of water and the cotton limbric is then passed between rollers until its weight is 200 parts. The cotton limbric is dried and is then padded through a solution of 2 parts of sodium hydroxide and 300 parts of sodium chloride in 1000 parts of water. The cotton limbric is passed between rollers until its weight is 200 parts and the cotton limbric is then stored for 30 minutes at 20° C. The dyed cotton limbric is then rinsed in water, immersed for 15 minutes in a 0.3% aqueous solution, at a temperature of 85° C., of a condensate of ethylene oxide with an alkylphenol, rinsed again in water and finally dried. The cotton limbric is dyed a greenish-yellow shade which possesses excellent fastness to wet treatments.

The dyestuff used in the above example may be obtained as follows:

45 parts of 2-hydroxy-5-methyl-4'-[4"chloro-6"-di-(β-hydroxyethyl)amino - 1":3":5" - triazin-2"-ylamino]azobenzene are stirred with 500 parts of acetone at a temperature of 25° C. and trimethylamine is then passed into the resulting solution for 30 minutes. The mixture is then stirred for 3 hours at 25° C., and the precipitated dyestuff is filtered off and dried.

thraquinone-2-sulphonic acid in 3000 parts of water at 20° C., and 150 parts of sodium chloride are added gradually during 20 minutes. 20 parts of a 40% aqueous solution of trimethylamine and 20 parts of trisodium phosphate are then added and dyeing is continued for 1 hour at 20° C. The dyed cotton yarn is then removed from the dyebath, rinsed in water, immersed for 15 minutes in a 0.3% aqueous solution, at a temperature of 90° C., of a condensate of ethylene oxide with an alkylphenol, rinsed again in water and finally dried.

The cotton yarn is dyed a bright blue shade possessing excellent fastness to wet treatments, and the dyeing is much stronger tinctorially than a dyeing obtained as described above except that the 20 parts of a 40% aqueous solution of trimethylamine were omitted from the dyebath.

In place of the 20 parts of a 40% aqueous solution of trimethylamine used in the above example there are used 10 parts of 1:4-diazabicyclo-(2:2:2)-octane when a similar result is obtained.

The following table gives further examples of dyeings obtained by the method described in Example 15 except that the 20 parts of the trisodium salt of the dyestuff used in Example 15 are replaced by equivalent amounts of the sodium salts of the dyestuffs which are obtained by condensing the amino compound listed in the second column of the table with the heterocyclic compound listed in the third column of the table, and/or the 60 parts of a 40% aqueous solution of trimethylamine used in Example 15 are replaced by equivalent amounts of the tertiary amines listed in the fourth column of the table. The fifth column of the table indicates the shades of the dyed cotton poplin.

| Example | Amino Compound | Heterocyclic Compound | Tertiary Amine | Shade |
|---|---|---|---|---|
| 32 | 1-(2':5'-dichloro-4'-sulphophenyl)-3-methyl-4-(5"-amino-2"-sulphophenylazo)-5-pyrazolone. | 2:4-dichloro-6-(m-sulphoanilino)-1:3;5-triazine. | Trimethylamino | Yellow. |
| 33 | do | 2:4:6-trichloropyrimidine | do | Do. |
| 34 | 2-(4'-amino-2'-methylphenylazo)naphthalene-4:8-disulphonic acid. | 2:4-dichloro-6-amino-1:3:5-triazine | do | Do. |
| 35 | do | 2:4-dichloro-6-methoxy-1:3:5-triazine | do | Do. |
| 36 | do | do | 1:4-diazabicyclo-(2:2:2)-octane. | Do. |
| 37 | 1-amino-7-(4'-methoxy-2'-sulphophenylazo)-8-naphthol-3:6-disulphonic acid. | do | do | Red. |
| 38 | do | 2:4:5:6-tetrachloropyrimidine | do | Red. |
| 39 | do | do | Trimethylamine | Red. |
| 40 | 1-amino-4-(4'-amino-3'-sulphoanilino)anthraquinone-2-sulphonic acid. | 2:4-dichloro-6-(m-sulphoanilino)-1:3:5-triazine. | do | Blue. |
| 41 | 1-amino-4-(4'-amino-3'-sulphoanilino)anthraquinone-2:5-disulphonic acid. | do | do | Do. |
| 42 | do | 2:4:6-tribromopyrimidine | Dimethylethylamine. | Do. |
| 43 | Copper complex of 1-amino-7-(2'-hydroxy-3'-chloro-5'-sulphophenylazo)-8-naphthol-3:6-disulphonic acid. | 2:4-dichloro-6-(m-sulphoanilino)-1:3:5-triazine. | Trimethylamine | Purple. |
| 44 | do | do | 1:4-diazabicyclo-(2:2:2)-octane. | Do. |
| 45 | Copper phthalocyanine 3-sulphon-N-(3'-amino-phenyl)amide sulphonamide sulphonic acid. | do | do | Greenish-blue. |
| 46 | do | 2:4:5:6-tetracholoropyrimidine | do | Do. |
| 47 | Copper phthalocyanine 4-sulphon-N-(3'-amino-4'-sulphophenyl)amide sulphonic acid. | do | do | Do. |
| 48 | 4-amino-2'-nitrodiphenylamino-3:4'-disulphonic acid | 5-cyano-2:4:6-trichloropyrimidine | do | Yellow. |

Example 30

100 parts of cotton yarn are immersed in a dyebath comprising a solution of 10 parts of 4-[4'-(2"-hydroxy-5"-methylphenylazo)anilino] - 6 - [di(β - hydroxyethyl)amino]1:3:5-triazin-2-yltrimethylammonium chloride in 2000 parts of water at a temperature of 18° C., and 100 parts of sodium chloride are gradually added during 30 minutes. 20 parts of trisodium phosphate are then added and dyeing is continued for 1 hour at 18° C. The dyed cotton yarn is then removed from the dyebath, rinsed in water, immersed for 15 minutes in a 0.3% aqueous solution of soap at a temperature of 100° C., rinsed again in water and finally dried. The cotton yarn is dyed a greenish-yellow shade possessing excellent fastness to wet treatments.

Example 31

100 parts of cotton yarn are immersed in a dyebath comprising a solution of 2 parts of the trisodium salt of 1 - amino - 4 - [3' - (4" - chloro - 6" - m - sulphoanilino-1":3":5" - triazin - 2" - ylamino) - 4' - sulphoanilino]an-

Example 49

100 parts of cotton limbric are padded through a solution of 20 parts of the trisodium salt of 4-{4'-[7"-(2"'-sulphophenylazo) - 8"'-hydroxy-3"':6"'-disulphonaphth-1"'-ylamino] - 6'-anilino-1':3':5'-triazin-2'-yl}-1-aza-4-azoniabicyclo-(2:2:2)-octane chloride, 20 parts of sodium chloride and 20 parts of sodium carbonate in 1000 parts of water at a temperature of 18° C., and the cotton limbric is passed between rollers until its weight is 200 parts. The cotton limbric is then stored for 3 hours at 20° C. The dyed cotton limbric is then rinsed in water, immersed for 15 minutes in a 0.3% aqueous solution of soap at 100° C., rinsed again in water and finally dried. The cotton limbric is dyed a red shade which possesses excellent fastness to wet treatments.

The following table gives further examples of dyeings obtained by the methods described in Examples 1 and 49 except that the 1 part of the dyestuff used in Example 1 or the 20 parts of the dyestuff used in Example 49 are replaced by equivalent amounts of the dyestuffs obtained by condensing the amino compound listed in the second column of the table with the heterocyclic compound listed in the third column of the table and subsequently condensing with the tertiary amine listed in the fourth column of the table. The fifth column of the table indicates the shades obtained.

The dyed wool serge is then removed from the dyebath, rinsed in water and dried. The wool serge is dyed a bluish-red shade and the fastness to washing is much superior to that of a dyeing obtained as described above except that the 0.15 part of 1:4-diazabicyclo-(2:2:2)-octane was omitted from the dyebath.

| Example | Amino Compound | Heterocyclic Compound | Tertiary Amine | Shade |
|---|---|---|---|---|
| 50 | 1 - amino - 7 - (2' - sulphophenylazo) - 8 - naphthol - 3:6-disulphonic acid. | 2:4 - dichloro - 6 - anilino - 1:3:5-triazine. | Dimethylbenzylamine. | Red. |
| 51 | ----do---- | ----do---- | N:N'-dimethylpiperazine. | Red. |
| 52 | ----do---- | ----do---- | Trimethylamine | Red. |
| 53 | ----do---- | ----do---- | Dimethyl-allylamine. | Red. |
| 54 | ----do---- | ----do---- | N-methylpyrrolidine. | Red. |
| 55 | ----do---- | ----do---- | Dimethyl-n-propylamine. | Red. |
| 56 | ----do---- | 2:4:6-trichloropyrimidine | Trimethylamine | Red. |
| 57 | 1 - amino - 4 - (4' - amino - 3' - sulphoanilino)anthraquinone-2-sulphonic acid. | 2:4 - dichloro - 6 - (3' - sulphoanilino)-1:3:5-triazine. | 1:4-diazabicyclo-(2:2:2)-octane. | Blue. |
| 58 | 2 - (4' - amino - 2' - acetylaminophenylazo)naphthalene-4:8-disulphonic acid. | 2:4 - dichloro - 6 - amino - 1:3:5-triazine. | ----do---- | Yellow. |
| 59 | 2 - amino - 6 - (4' - methoxy - 2' - sulphophenylazo) - 5-naphthol-7-sulphonic acid. | 2:4 - dichloro - 6 - methoxy - 1:3:5-triazine. | Trimethylamine | Scarlet. |
| 60 | ----do---- | 2:4:6-trichloropyrimidine | ----do---- | Do. |
| 61 | Copper complex of 1-amino-7-(2'-hydroxy-3'-chloro-5'-sulphophenylazo)-8-naphthol-3:6-disulphonic acid. | 2:4 - dichloro - 6 - (m - sulphoanilino)-1:3:5-triazine. | ----do---- | Purple. |
| 62 | Copper complex of 1-amino-7-(2'-hydroxy-5'-sulphophenylazo)-5-naphthol-1:7-disulphonic acid. | ----do---- | ----do---- | Rubine. |
| 63 | 1 - benzoylamino - 7 - (5' - amino - 2' - sulphophenylazo)8-naphthol-3:6-disulphonic acid. | 2:4 - dichloro - 6 - (p - sulphoanilino)-1:3:5-triazine. | ----do---- | Red. |
| 64 | 1:2-chromium complex of 2-amino-6-(7'-nitro-4'-sulpho-2'-hydroxynaphth-1'-ylazo)-5-naphthol-7-sulphonic acid. | ----do---- | ----do---- | Bluish-grey. |
| 65 | 1:2-cobalt complex of 2-amino-6-(7'-nitro-4'-sulpho-2'-hydroxynaphth-1'-ylazo)-5-naphthol-7-sulphonic acid. | ----do---- | ----do---- | Do. |
| 66 | 3-amino-4'-acetyl-2'-nitrodiphenylamine-4-sulphonic acid | 2:4 - dichloro - 6 - methoxy - 1:3:5-triazine. | ----do---- | Yellow. |
| 67 | ----do---- | ----do---- | 1:4-diazabicyclo-(2:2:2)-octane. | Do. |
| 68 | 1 - amino - 4 - (4' - aminoanilino)anthraquinone - 2:3':5-trisulphonic acid. | ----do---- | ----do---- | Blue. |
| 69 | ----do---- | 2:4 - dichloro - 6 - (m - sulphoanilino)-1:3:5-triazine. | ----do---- | Do. |
| 70 | ----do---- | 2:4:6-trichloropyrimidine | Trimethylamine | Do. |
| 71 | Mixture of 1-amino-4-[4'-{β-(4''-aminophenyl)-vinyl}anilino]anthraquinone-2:2'':3':5- and -2:2'':3':8-tetrasulphonic acids. | 2:4 - dichloro - 6 - methoxy - 1:3:5-triazine. | ----do---- | Green. |
| 72 | Copper phthalocyanine-3-sulphon-N-(4'-aminophenyl)-amide sulphonamide sulphonic acid. | ----do---- | ----do---- | Greenish-blue. |

The following table gives further examples of dyeings obtained by the methods described in Examples 1 and 49 except that the 1 part of the dyestuff used in Example 1 or the 20 parts of the dyestuff used in Example 49 are replaced by equivalent amounts of the dyestuffs obtained by condensing 1-amino-7-(2'-sulphophenylazo-8-naphthol-3:6-disulphonic acid with the heterocyclic compound listed in the second column of the table, subsequently condensing with the sulphur compound listed in the third column of the table and finally condensing with the tertiary amine listed in the fourth column of the table. In all these examples red shades were obtained on the cellulose textile materials.

*Example 84*

20 parts of wool serge are immersed in a dyebath comprising a solution of 0.2 part of the trisodium salt of 4-{4'-[7''-(2'''-sulphophenylazo) - 8'' - hydroxy-3'':6''-disulphonaphth-1''-ylamino] - 6 - anilino-1':3':5'-triazin-2'-yl}-1-aza-4-azoniabicyclo - (2:2:2) - octane hydrochloride and 0.2 part of acetic acid in 1000 parts of water, and the dyebath is heated to 100° C. and maintained at this temperature for 1 hour. The dyed wool serge is then removed from the dyebath, rinsed in water and dried.

The wool serge is dyed a bright bluish-red shade which possesses good fastness to light and to washing.

| Example | Amino Compound | Sulphur Compound | Tertiary Amine |
|---|---|---|---|
| 73 | 2:4-dichloro-6-anilino-1:3:5-triazine | Sodium diethyldithiocarbamate | Trimethylamine. |
| 74 | ----do---- | Sodium salt of 2-mercaptobenzthiazole | Do. |
| 75 | ----do---- | ----do---- | 1:4-diazabicyclo-(2:2:2)-octane. |
| 76 | ----do---- | Sodium phenol-4-sulphonate | Do. |
| 77 | ----do---- | ----do---- | Trimethylamine. |
| 78 | 2:4-dichloro-6-(m-sulphoanilino)-1:3:5-triazine | Sodium salt of 2-mercaptobenzthiazole | Do. |
| 79 | 2:4:6-trichloropyrimidine | ----do---- | Do. |
| 80 | 2:4-dichloro-6-anilino-1:3:5-triazine | Sodium sulphite | Do. |
| 81 | ----do---- | Potassium thiocyanate | Do. |
| 82 | ----do---- | Sodium 1-naphthol-4-sulphonate | Do. |

*Example 83*

20 parts of wool serge are immersed in a dyebath comprising a solution of 0.2 part of the trisodium salt of 1-(4'-chloro-6'-anilino - 1':3':5' - triazin-2'-ylamino)-7-(2''-sulphophenylazo)-8-naphthol-3:6-disulphonic acid, 2 parts of potassium dihydrogen phosphate, 0.15 part of 1:4-diazabicyclo-(2:2:2)-octane and 0.1 part of acetic acid in 1000 parts of water, and the dyebath is heated to 100° C. and maintained at this temperature for 10 minutes.

*Example 85*

In place of the 0.2 part of the dyestuff used in Example 84 there is used 0.2 part of the trisodium salt of 1-{4'-[7''-(2'''-sulphophenylazo) - 8'' - hydroxy - 3'':6'' - disulphonaphth-1''-ylamino] - 6' - anilino-1':3':5'-triazin-2'-yl}pyridinium chloride when a similar result is obtained.

The dyestuff used in this example may be obtained as follows:

A mixture of 25 parts of the trisodium salt of 1-(4'- chloro-6'-anilino - 1':3':5' - triazin - 2' - ylamino)-7-(o-sulphophenylazo)-8-naphthol-3:6-disulphonic acid, 50 parts of pyridine and 250 parts of water is stirred for 10 minutes at 80° C. The resulting solution is cooled at 20° C., 500 parts of acetone are added and the precipitated dyestuff is filtered off and dried.

*Example 86*

100 parts of bleached cotton yarn are immersed in a dyebath comprising a solution of 3 parts of the trisodium salt of 1-{4'-[7''-(2'''-sulphophenylazo) - 8'' - hydroxy-3'':6''-disulphonaphth-1''-ylamino] - 6' - anilino-1':3':5'-triazin-2'-yl}-2-methylpyridinium chloride in 3000 parts of water at a temperature of 95° C., and 240 parts of sodium chloride are then added gradually during 30 minutes. 30 parts of sodium bicarbonate are added and dyeing is continued for 90 minutes at 95° C. The dyed cotton yarn is then removed from the dyebath, rinsed in water, given a "soaping treatment" in a 0.3% aqueous solution, at a temperature of 100° C., of a condensate of ethylene oxide with an alkylphenol, rinsed again in water, and finally dried.

The cotton yarn is dyed a bright red shade possessing excellent fastness to wet treatments.

The dyestuff used in this example may be obtained by the method described at the end of Example 85 except that the 50 parts of pyridine are replaced by 50 parts of α-picoline.

*Example 87*

100 parts of regenerated cellulose yarn are immersed in a dyebath comprising a solution of 3 parts of the disodium salt of 1-{4'-amino-6'-[3''-acetylamino - 4'' - (4''':8'''-disulphonaphth - 2''' - ylazo)anilino] - 1':3':5' - triazin-2'-yl}pyridinium chloride in 3000 parts of water at 60° C., and 180 parts of sodium chloride are added gradually during 30 minutes. 30 parts of sodium carbonate are then added and dyeing is continued for 90 minutes at a temperature of 60° C. The dyed yarn is then rinsed in water, given a "soaping treatment" in a 0.3% aqueous solution, at a temperature of 100° C., of a condensate of ethylene oxide with an alkylphenol, rinsed again in water and finally dried.

The regenerated cellulose yarn is dyed a bright yellow shade possessing excellent fastness to wet treatments such as washing.

The dyestuff used in this example may be obtained by the method described at the end of Example 85 except that the 25 parts of the trisodium salt of the azo compound used in this method are replaced by 22 parts of 2-chloro - 4 - amino-6-[-3'-acetylamino - 4' - (4'':8''-disulphonaphth-2''-ylazo)anilino]-1:3:5-triazine.

*Example 88*

100 parts of regenerated cellulose yarn are immersed in a dyebath comprising a solution of 2 parts of the trisodium salt of 1-{4'-[7''-(2'''-sulphophenylazo - 8'' - hydroxy-3'':6''-disulphonaphth - 1'' - ylamino] - 6' - anilino-1':3':5'-triazin-2'-yl}-pyridinium chloride and 90 parts of sodium sulphate in 3000 parts of water at a temperature of 25° C., and dyeing is carried out for 30 minutes at this temperature. 30 parts of trisodium phosphate are then added and dyeing is continued for a further 90 minutes at 25° C. The dyed yarn is then removed from the dyebath, rinsed in water, given a "soaping treatment" in a 0.3% aqueous solution, at a temperature of 100° C., of a condensate of ethylene oxide with an alkylphenol, rinsed again in water and finally dried.

The yarn is dyed a bright red shade possessing excellent fastness to wet treatments.

*Example 89*

100 parts of regenerated cellulose yarn are immersed in a dyebath comprising a solution of 3 parts of the disodium salt of 1-{4'-amino - 6' - [3''-acetylamino-4''-(4''':8'''-disulphonaphth - 2''' - ylazo)anilino]-1':3':5'-triazin-2'-yl}pyridinium chloride and 240 parts of sodium chloride in 3000 parts of water and dyeing is carried out for 5 hours at a temperature of 100° C. The dyed yarn is then removed from the dyebath, given a "soaping treatment" in a 0.3% aqueous solution, at a temperature of 100° C., of a condensate of ethylene oxide with an alkylphenol, rinsed again in water and finally dried.

The yarn is dyed a bright yellow shade possessing excellent fastness to washing.

The following table gives further examples of dyeings obtained by the methods described in Examples 84 to 89 except that the amounts of dyestuffs used in these examples are replaced by similar amounts of the dyestuffs obtained by condensing the amino compounds listed in the second column of the table with the heterocyclic compounds listed in the third column of the table and subsequently condensing with the tertiary amines listed in the fourth column of the table. The fifth column of the table indicates the shades obtained.

| Example | Amino compound | Heterocyclic compound | Tertiary amine | Shade |
|---|---|---|---|---|
| 90 | 1-(2':5'-dichloro-4'-sulphophenyl)-3-methyl-4-(b''-amino-2''-sulphophenylazo)-5-pyrazolone. | 2:4-dichloro-6-(m-sulphoanilino)-1:3:5-triazine. | Pyridine | Yellow. |
| 91 | ---do--- | ---do--- | Isoquinoline | Do. |
| 92 | ---do--- | 2:4:6-trichloropyrimidine | Pyridine | Do. |
| 93 | Copper complex of 2-amino-6-(2'-hydroxy-5'-sulphophenylazo)-5-naphthol-1:7-disulphonic acid. | 2:4-dichloro-6-(m-sulphoanilino)-1:3:5-triazine. | ---do--- | Rubine. |
| 94 | ---do--- | ---do--- | γ-Picoline | Do. |
| 95 | 2-N-methylamino-6-(4'-methoxy-2'-sulphophenylazo)-5-naphthol-7-sulphonic acid. | 2:4-dichloro-6-methoxy-1:3:5-triazine. | Pyridine | Scarlet. |
| 96 | ---do--- | ---do--- | ---do--- | Do. |
| 97 | 1-benzoylamino-7-(5'-amino-2'-sulphophenylazo)-8-naphthol-3:6-disulphonic acid. | 2:4:5:6-tetrachloropyrimidine / 2:4-dichloro-6-(m-sulphoanilino)-1:3:5-triazine. | α-Picoline | Red. |
| 98 | Copper complex of 1-amino-7-(2'-hydroxy-3'-chloro-5'-sulphophenylazo)-8-naphthol-3:6-disulphonic acid. | ---do--- | ---do--- | Purple. |
| 99 | 1-amino-4-(4'-amino-3'-sulphoanilino)anthraquinone-2:5-disulphonic acid. | ---do--- | ---do--- | Blue. |

*Example 100*

100 parts of cotton limbric are immersed in a dyebath comprising a solution of 1 part of the trisodium salt of 1-(trichloropyrimidylamino) - 7 - (2' - sulphophenylazo)-8-naphthol-3:6-disulphonic acid (which may be obtained by condensing 2:4:5:6-tetrachloropyrimidine with 1-amino - 7 - (2' - sulphophenylazo) - 8 - naphthol - 3:6 - disulphonic acid) in 3000 parts of water at 25° C., and 150 parts of sodium chloride are gradually added during 30 minutes. 20 parts of sodium carbonate are then added, dyeing is continued for 5 minutes at 25° C., 10 parts of 1:4-diazabicyclo-(2:2:2)-octane are added and dyeing is then continued for a further 90 minutes at 25° C. The dyed cotton limbric is then removed from the dyebath, rinsed in water, given a "soaping treatment," in a 0.3% aqueous solution, at a temperature of 100° C., of a mixture of a sulphated fatty alcohol and a condensate of ethylene oxide with an alkylphenol, rinsed again in water and finally dried. The cotton limbric is dyed a bluish-red shade whereas when the 10 parts of 1:4-diazabicyclo-(2:2:2)-octane are omitted from the dyebath the cotton limbric is virtually uncoloured.

*Example 101*

100 parts of bleached mercerised cotton cloth are padded through a solution of 20 parts of the trisodium salt of 1-{4'-anilino-6'-[7''-(o-sulphophenylazo)-8''-hydroxy - 3'':6'' - disulphonaphth-1''-ylamino]-1':3':5'-triazin-2'-yl}pyridinium chloride, 70 parts of a 50% aqeous solution of dimethylolglyoxalmonourein, 5 parts of sodium triisopropyl naphthalene sulphonate, 15 parts of a 50% aqueous solution of N:N-di(β-hydroxyethyl)amine hydrochloride, 5 parts of methylol stearamide and 5 parts of sodium chloride in 1000 parts of water, and the cotton cloth is then squeezed between rollers until its weight is 200 parts. The cotton cloth is dried at 65° C., and is then baked for 3 minutes at 150° C. The cotton cloth is immersed for 1 minute in an aqueous solution containing 1% of a mixture of a condensate of ethylene oxide with an alkylphenol and of a sulphated fatty alcohol and 3% of sodium carbonate at a temperature of 100° C., rinsed in water and finally dried.

The cotton cloth is dyed a bright red shade possessing excellent fastness to wet treatments and the cotton cloth is simultaneously rendered resistant to creasing.

In place of the 70 parts of a 50% aqueous solution of dimethyloglyoxalmonourein used in the above example there are used equivalent amounts of dimethylol-N-β-hydroxyethyltriazone, trimethylolmelamine or tetramethylolglyoxaldiurein and/or the 15 parts of a 50% aqueous solution of N:N-di(β-hydroxyethyl)amine hydrochloride used in the above example there are used equivalent amounts of N-methylglucamine hydrochloride or a 5:1-mixture of N:N-di(β-hydroxyethyl)amine hydrochloride and ammonium nitrate.

*Example 102*

A print paste comprising:

| | Parts |
|---|---|
| Trisodium salt of the copper complex of 4-(m-sulphoanilino) - 6 - [4' - hydroxy - 6' - (2'' - hydroxy - 5'' - sulphophenylazo) - 7' - sulphonaphth-2' - ylamino] - 1:3:5 - triazin - 2 - yltrimethylammonium chloride | 30 |
| 4:5-dihydroxy-1:3-dimethylol-2-imidazolidone | 100 |
| 4% aqueous solution of sodium alginate | 350 |
| Diethanolamine hydrochloride | 8 |
| Ammonium nitrate | 2 |
| Methylol stearamide | 10 |
| Water | 500 |
| | 1000 | is printed on to mercerised cotton sateen by roller printing. The printed material is dried at 70° C., and is then baked for 5 minutes at 170° C. The printed materal is then immersed for 5 minutes in a boiling aqueous solution containing 0.2% of a condensate of ethylene oxide with an alkylphenol. The printed material is then rinsed in water and dried. The material is printed a rubine shade which possesses excellent fastness to wet treatments.

*Example 103*

100 parts of a polyacrylonitrile textile material are immersed in a dyebath comprising a solution of 1.5 parts of 4-N:N-di(β - hydroxyethyl)amino - 6 - [4' - (2'' - hydroxy - 5'' - methylphenylazo)anilino] - 1:3:5 - triazin - 2-yltrimethylammonium chloride in 4000 parts of water and dyeing is then carried out for 1 hour at 100° C. The dyed textile material is then removed from the dye bath, rinsed in water and dried.

The polyacrylonitrile textile material is dyed a deep yellow shade possessing very good fastness to washing.

*Example 104*

In place of the 1.5 parts of the dyestuff used in Example 103 there are used 1.5 parts of 4-{4'-N:N-di(β-hydroxyethyl)amino - 6' - [4'' - (2''' - hydroxy - 5'''-methylphenylazo)anilino] - 1':3':5' - triazin - 2' - yl} - 1-aza-4-azoniabicyclo-(2:2:2)-octane chloride when a similar result is obtained.

*Example 105*

100 parts of acetate rayon are immersed in a dyebath comprising a solution of 1.5 parts of 4-N:N-di(β-hydroxyethyl)-amino - 6 - [4' - (2'' - hydroxy - 5'' - methylphenylazo)-anilino]-1:3:5-triazin-2-yltrimethylammonium chloride in 4000 parts of water and dyeing is then carried out for 1 hour at 85° C. The dyed textile material is then removed from the dyebath, rinsed in water and dried.

The acetate rayon is dyed a yellow shade possessing good fastness to washing.

What we claim is:

1. Process for simultaneous finishing and coloring of textile materials selected from the class consisting of cotton, linen, viscose rayon, wool, silk, polyamide, polyacrylonitrile, polyesters, and cellulose acetates which consists essentially in treating the said textile materials with an aqueous solution containing (1) a resin-forming textile material finishing composition, (2) an acid-catalyst, and (3) a dyestuff of the formula:

$$Dy-A-Z$$

wherein Dy represents a chromophoric grouping; A represents a member selected from the class consisting of oxygen, sulfur, and the

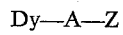

group; wherein Y represents a member selected from the class consisting of hydrogen, lower alkyl, hydroxy lower alkyl, methoxy lower alkyl, and cyclo alkyl radicals; and Z represents a heterocyclic ring selected from the class consisting of quinazoline, phthalazine, pyridine, quinoline, pyrimidine, and 1:3:5-triazine rings, and which is attached to A through a carbon atom of the heterocyclic ring and which also carries at least one group of the formula

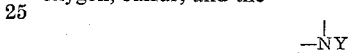

free from sulfuric acid groups and wherein $R^1$ and $R^2$ independently represent a methyl radical and $R^3$ independently represents a member selected from the class consisting of allyl, lower alkyl, hydroxy lower alkyl, alkoxy lower alkyl, aryl lower alkyl, amino lower alkyl, and carboxy lower alkyl; and, taken together, at least two of $R^1$, $R^2$, and $R^3$ stand for the atoms required to form with the nitrogen atom N a heterocyclic ring selected from the class consisting of pyrrolidine, pyrroline, piperidine, morpholine, piperazine, pyrrole, isoquinoline, pyrrolizidine, 1-azabicyclo-(2:2:1)-heptane, quinuclidine, 1-azabicyclo-(3:2:1)-octane, 1-azabicyclo-(3:2:2)-nonane, 1-isogranatanine, conidine, 1:5-diazabicyclo-(3:3:1)nonane, julolidine, hexahydrojulolidine, lilolidine, and 1:4 - diazabicyclo-(2:2:2)-octane, and pyridine; and B is an anion selected from the class consisting of bromine, chlorine, sulfate, thiocyanate, sulfonated aryloxide, sulfonated arylthiooxide,

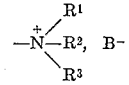

and

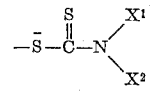

wherein $X^1$ and $X^2$ are selected from the group consisting of lower alkyl, hydroxy lower alkyl, lower alkoxy lower alkyl, phenyl-substituted lower alkyl, cyclohexyl, phenyl, tolyl, naphthyl, pyridyl, and morpholino and the chloro-, bromo-, nitro-, alkoxy, sulfo, and carboxy derivatives of phenyl, tolyl, and naphthyl; and, taken together, with the nitrogen atom N piperidyl and morpholino; and the symbol

represents a heterocyclic ring selected from the class consisting of furane, oxazole, pyrazole, selenazole, thiophene, pyran, pyridine, pyridazine, thiazole, quinoline, benzthiazole, and naphthothiazole rings, and such heterocyclic rings substituted by lower alkyl and chloro.

2. Process as claimed in claim 1, wherein said textile material is a cellulose textile material and the dyestuff is formed in situ in said aqueous solution by adding thereto a dyestuff compound having the formula:

wherein Dy represents a chromophoric grouping; A represents a member selected from the class consisting of oxygen, sulfur and the

group; wherein Y represents a member selected from the class consisting of hydrogen, lower alkyl, hydroxy lower alkyl, methoxy lower alkyl, and cyclo alkyl radicals; and Z' represents a heterocyclic ring selected from the class consisting of quinazoline, phthalazine, pyridine, quinoline, pyrimidine, and 1:3:5-triazine rings, and which is attached to A through a carbon atom of the heterocyclic ring and which carries at least one member selected from the group consisting of labile halogen atom, and labile groups; and also adding thereto a tertiary amine having the formula:

$$(R^1)-(R^2)-(R^3)-N$$

wherein $R^1$ and $R^2$ independently represent a methyl radical and $R^3$ independently represents a member selected from the class consisting of allyl, lower alkyl, hydroxy lower alkyl, alkoxy lower alkyl, aryl lower alkyl, amino lower alkyl, and carboxy lower alkyl; and, taken together, at least two of $R^1$, $R^2$, and $R^3$ stand for the atoms required to form the nitrogen atom N a heterocyclic ring selected from the class consisting of pyrrolidine, pyrroline, piperidine, morpholine, piperazine, pyrrole, isoquinoline, pyrrolizidine, 1-azabicyclo-(2:2:1)-heptane, quinuclidine, 1-azabicyclo-(3:2:1)-octane, 1-azabicyclo-(3:2:2)-nonane, 1-isogranatine, conidine, 1:5-diazabicyclo-(3:3:1)-nonane, julolidine, hexahydrojulolidine, lilolidine, and 1:4-diazobicyclo-(2:2:2)-octane, and pyridine.

3. Process for coloring textile materials selected from the class consisting of cotton, linen, viscose rayon, wool, silk, polyamide, polyacrylonitrile, polyesters, and cellulose acetates, which comprises treating said textile materials with a dyestuff of the formula:

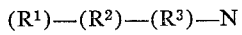

wherein Dy represents a chromophoric grouping; A represents a member selected from the class consisting of oxygen, sulfur, and the $$-\overset{|}{N}Y$$

group; wherein Y represents a member selected from the class consisting of hydrogen, lower alkyl, hydroxy lower alkyl, methoxy lower alkyl, and cyclo alkyl radicals; and Z represents a heterocyclic ring selected from the class consisting of quinazoline, phthalazine, pyridine, quinoline, pyrimidine, and 1:3:5-triazine rings, and which is attached to A through a carbon atom of the heterocyclic ring and which also carries at least one group of the formula:

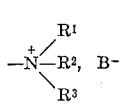

free from sulfuric acid groups and wherein $R^1$ and $R^2$ independently represent a methyl radical and $R^3$ independently represents a member selected from the class consisting of allyl, lower alkyl, hydroxy lower alkyl, alkoxy lower alkyl, aryl lower alkyl, amino lower alkyl, and carboxy lower alkyl; and, taken together, at least two or $R^1$, $R^2$, and $R^3$ stand for the atoms required to form with the nitrogen atom N a heterocyclic ring selected from the class consisting of pyrrolidine, pyrroline, piperidine, morpholine, piperazine, pyrrole, isoquinoline, pyrrolizidine, 1-azabicyclo-(2:2:1)-heptane, quinuclidine, 1-azabicyclo-(3:2:1)-octane, 1-azabicyclo-(3:2:2)-nonane, 1-isogranatine, conidine, 1:5-diazabicyclo-(3:3:1)-nonane, julolidine, hexahydrojulolidine, lilolidine, and 1:4-diazabicyclo-(2:2:2)-octane, and pyridine; and B is an anion selected from the class consisting of bromine, chlorine, sulfate, thiocyanate, sulfonated aryloxide, sulfonated arylthiooxide,

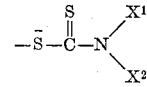

and

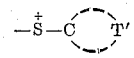

wherein $X^1$ and $X^2$ are selected from the group consisting of lower alkyl, hydroxy, lower alkyl, lower alkoxy lower alkyl, phenyl-substituted lower alkyl, cyclohexyl, phenyl, tolyl, naphthyl pyridyl, and morpholino and the chloro-, bromo-, nitro-, alkoxy, sulfo, and carboxy derivatives of phenyl, tolyl, and naphthyl; and taken together with the nitrogen atom N piperidyl and morpholino; and the symbol

represents a heterocyclic ring selected from the class consisting of furane, oxazole, pyrazole, selenazole, thiophene, pyran, pyridine, pyradazine, thiazole, quinoline, benzthiazole, and naphthothiazole rings, and such heterocyclic rings substituted by lower alkyl and chloro.

4. Process as claimed in claim 3, wherein Z represents a 1:3:5-triazine ring.

5. Process as claimed in claim 3, wherein Z represents a pyrimidine ring.

6. Process as claimed in claim 3, wherein the

group represents the group of the formula:

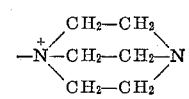

7. Process as claimed in claim 3, wherein the

group represents the group of the formula:

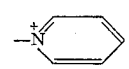

8. Process as claimed in claim 3, wherein the dyestuff contains from one to two groups selected from groups having the formula:

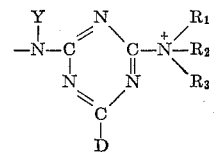

wherein $R_1$, $R_2$, $R_3$ and Y have the meanings stated in claim 3, and D represents a member of the group consisting of amino and substituted amino groups.

9. Process as claimed in claim 3, wherein the dyestuff contains from one to two groups selected from groups having the formula:

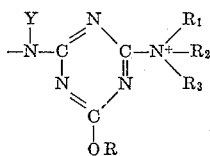

wherein $R_1$, $R_2$, $R_3$, and Y have the meanings stated in claim 3, and R represents an alkyl radical.

10. Process as claimed in claim 3, wherein $R_1$, $R_2$, and $R_3$ each represent a methyl group.

11. Process as claimed in claim 3, wherein said dyestuff is formed in situ during the said treating of said taxtile material by applying to said textile material in the aqueous solution a dyestuff compound having the formula:

$$Dy—A—Z'$$

wherein Dy represents a chromophoric grouping; A represents a member selected from the class consisting of oxygen, sulfur, and the

group; wherein Y represents a member selected from the class consisting of hydrogen, lower alkyl, hydroxy lower alkyl, methoxy lower alkyl, and cyclo alkyl radicals; and Z' represents a heterocyclic ring selected from the class consisting of quinazoline, phthalazine, pyridine, quinoline, pyrimidine, and 1:3:5-triazine rings, and which is attached to A through a carbon atom of the heterocyclic ring and which carries at least one member selected from the group consisting of labile halogen atom, and labile groups; and also treating said textile material with a tertiary amine of the formula:

$$(R^1)—(R^2)—(R^3)—N$$

wherein $R^1$ and $R^2$ independently represent a methyl radical and $R^3$ independently represents a member selected from the class consisting of allyl lower alkyl, hydroxy lower alkyl, alkoxy lower alkyl, aryl lower alkyl, amino lower alkyl, and carboxy lower alkyl; and, taken together, at least two of $R^1$, $R^2$, and $R^3$ stand for the atoms selected to form the nitrogen atom N a heterocyclic ring selected from the class consisting of pyrrolidine, pyrroline, piperidine, morpholine, piperazine, pyrrole, isoquinoline, pyrrolizidine, 1-azabicyclo-(2:2:1)-heptane, quinuclidine, 1-azabicyclo-(3:2:1)-octane, 1-azabicyclo - (2:2:2)-nonane, 1-isogranatine, conidine, 1:5-diazabicyclo-(3:3:1)-nonane, julolidine, hexahydrojulolidine, lilodine, and 1:4-diazabicyclo-(2:2:2)-octane, and pyridine.

12. The process as claimed in claim 11, wherein said tertiary amine is 1:4-diazabicyclo-(2:2:2)-octane.

References Cited in the file of this patent
UNITED STATES PATENTS

| | | |
|---|---|---|
| 2,190,848 | Petersen et al. | Feb. 20, 1940 |
| 2,192,127 | Ebel et al. | Feb. 27, 1940 |
| 2,235,480 | Graenacher et al. | Mar. 18, 1941 |
| 2,873,269 | Fasciati et al. | Feb. 10, 1959 |
| 2,895,785 | Alsberg et al. | July 21, 1959 |

FOREIGN PATENTS

| | | |
|---|---|---|
| 174,377 | Austria | Mar. 25, 1953 |

OTHER REFERENCES

Broden et al.: Amer. Dyestuff Reporter, Jan. 4, 1954, pp. P6–P13, particularly P8 and P9.